(12) United States Patent
Okawara

(10) Patent No.: US 7,415,200 B2
(45) Date of Patent: Aug. 19, 2008

(54) IMAGING DEVICE

(75) Inventor: Hiroto Okawara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 10/965,472

(22) Filed: Oct. 13, 2004

(65) Prior Publication Data
US 2005/0078381 A1   Apr. 14, 2005

(30) Foreign Application Priority Data
Oct. 14, 2003 (JP) ............................. 2003-354372
Oct. 21, 2003 (JP) ............................. 2003-361291

(51) Int. Cl.
G03B 17/00   (2006.01)
(52) U.S. Cl. .......................................... 396/82; 396/85
(58) Field of Classification Search ............. 396/79–82, 396/85, 87
See application file for complete search history.

(56) References Cited

U.S. PATENT DOCUMENTS 5,005,956 A   4/1991   Kaneda
5,146,071 A * 9/1992   Ookubo et al. ........... 250/201.2
5,448,413 A * 9/1995   Kobayashi et al. .......... 359/698

* cited by examiner

*Primary Examiner*—W. B. Perkey
*Assistant Examiner*—Rishi S Suthar
(74) *Attorney, Agent, or Firm*—Canon USA Inc I.P. Div

(57) ABSTRACT

A lens control device, for controlling driving of a second lens unit for correcting image movement regarding movement of a variating first lens unit, comprises: a storage unit for storing data indicating the position of the second lens unit corresponding to the position of the first lens unit created for a predetermined focal distance; a control unit for generating information to control driving of the second lens unit based on the data, and for controlling driving of the second lens unit based on this information; and a distance detecting unit for detecting distance to the focus object; wherein the control unit restricts the range of the generated information based on the detection results from the distance detecting unit. Or, the control unit controls driving for the second lens unit to generate the information, and performs weighting based on detection results from the distance detecting unit relating to driving control.

5 Claims, 20 Drawing Sheets

$$a_x = a_k - \frac{(Z_k - Z_{k-1})(a_k - a_{k-1})}{(Z_k - Z_{k-1})}$$

$$b_k = b_k - \frac{(Z_k - Z_{k-1})(b_k - b_{k-1})}{(Z_k - Z_{k-1})}$$

FIG. 12

FOCUS POSITION
∞ ←――――――――――→ CLOSEUP

ZOOM POSITION: W ↕ T

| | | n | | | | | | |
|---|---|---|---|---|---|---|---|---|
| | | 0 | 1 | 2 | 3 | | k | | m |
| V | 0 | A00 | A10 | A20 | A30 | --- | Ak0 | --- | Am0 |
| | 1 | A01 | A11 | A21 | A31 | --- | Ak1 | --- | Am1 |
| | 2 | A02 | A12 | A22 | A32 | --- | Ak2 | --- | Am2 |
| | 3 | A03 | A13 | A23 | A33 | --- | Ak3 | --- | Am3 |
| | \| | \| | \| | \| | \| | --- | \| | --- | \| |
| | k | A0k | A1k | A2k | A3k | --- | Akk | --- | Amk |
| | \| | \| | \| | \| | \| | --- | \| | --- | \| |
| | s | A0s | A1s | A2s | A3s | --- | Aks | --- | Ams |

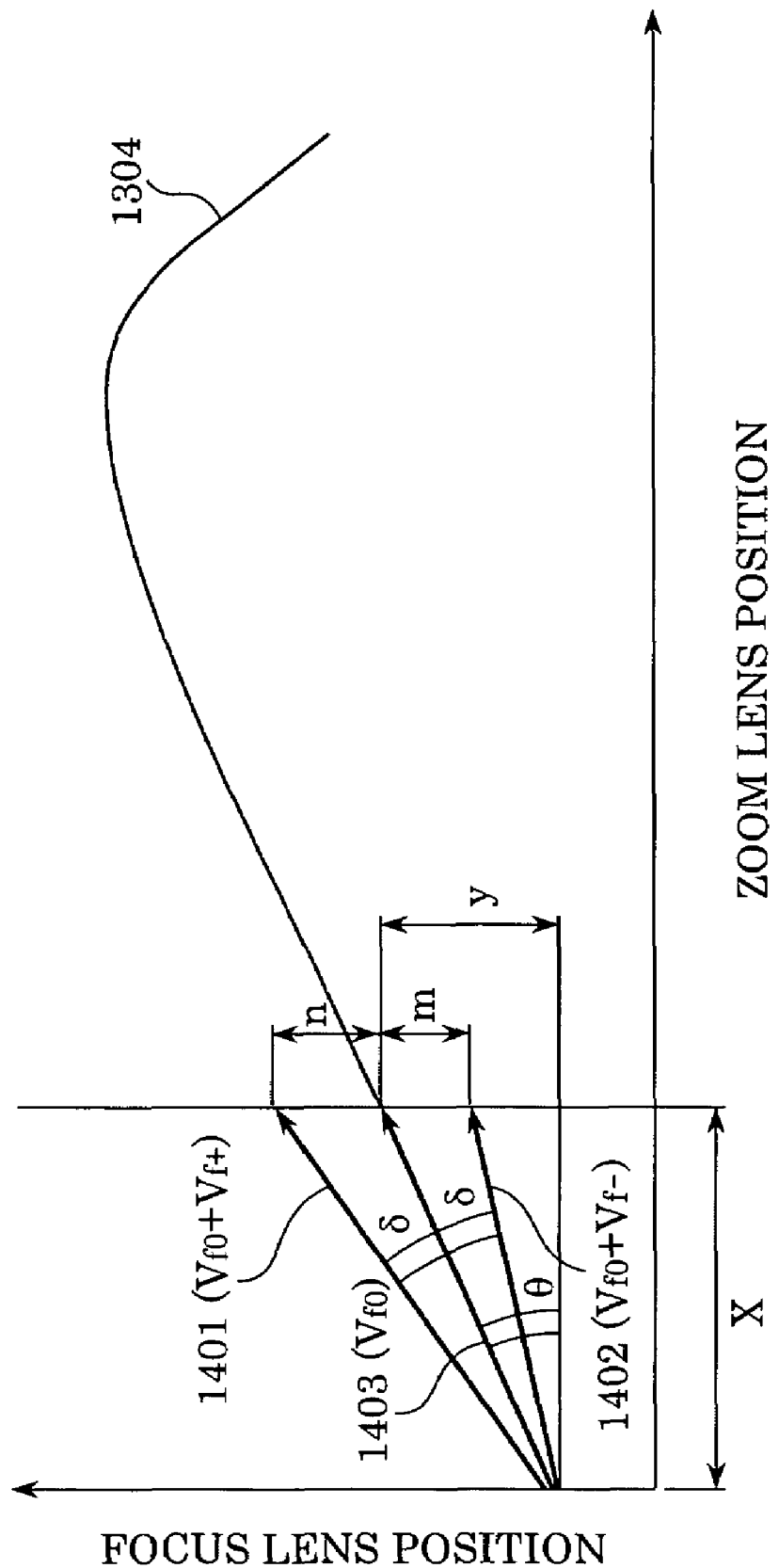

SUBJECT/DISTANCE $L = \dfrac{B \cdot f}{X}$

IMAGING DEVICE

This application claims priority from Japanese Patent Application Nos. 2003-354372 filed Oct. 14, 2003, and 2003-361291 filed Oct. 21, 2003, which are hereby incorporated by reference herein.

BACKGROUND OF THE INVENTION

1. Field of the Invention

The present invention relates to optical equipment such as a video camera, digital camera, and so forth.

2. Description of the Related Art

With regard to cameras with non-interchangeable lenses, there are demands for reduction in size, the ability to photograph subjects from as close as possible, and so forth. Therefore, rather than interlocking a correcting lens and a variable power lens mechanically by a cam, a so-called inner focus type lens is becoming mainstream, wherein the movement locus of the correcting lens is input in advance as lens cam data within a microcomputer, which drives the correcting lens according to this lens cam data, and further sets the focus by means of this correcting lens.

FIG. 8 is a figure that illustrates the configuration of a lens system with the current inner focus type. Here, reference numeral 901 denotes a fixed front lens, 902 denotes a zoom lens for variable power (also referred to as a variator lens: first lens unit), 903 denotes an aperture diaphragm, 904 denotes a fixed lens that is fixed, and 905 denotes a focus lens (second lens unit) to be used as a correcting lens, which provides a focal point adjusting function and a function that corrects the movement of the image based on the variable power. Further, 906 denotes an imaging plane.

With a lens system configured as in FIG. 8, the focus lens 905 provides both a compensator function and a focal point adjusting function, therefore even if the focal point distance is equal, the position of the focus lens 905 for converging with the imaging plane 906 differs based on the subject distance. When the subject distance is changed with regard to each focal point distance, and when the position of the focus lens 905 is continuously plotted to focus with the subject image on the imaging plane 906, the result is as shown in FIG. 9. While zooming in or out, selecting a locus corresponding to the subject distance from the multiple loci illustrated in FIG. 9 moves the focus lens 905 according to the selected locus, thereby enabling variable power (zooming) while storing the focused state.

Now, with regards to the type of a lens system where the front lens performs the focusing, a focus lens independent of the zoom lens is provided, and further, the zoom lens and the focus lens are mechanically linked to a cam ring. Therefore, in the case of trying to rotate the cam ring manually and change the focal point for example, even if the cam ring is moved very fast, the cam ring follows and rotates. The zoom lens and the focus lens move in the direction of the optical axis, according to the cam formed by the cam ring, and therefore, is the focus lens is in a converging position, the image will not blur due to zooming.

In contrast to this, a lens system of an inner focus type generally records in memory the information of the multiple loci illustrated in FIG. 9 (also called electronic cam locus) or the information corresponding to this (in other words, either information indicating the locus itself, or a function wherein the lens position is a variable, is suitable), selects a locus based on the positions of the focus lens and the zoom lens, and performs zooming while moving along the selected locus.

Now, in the case that the zoom lens moves in the direction from telephoto to wide angle, focus can be maintained using the above-described locus following method, because it converges from a state wherein multiple loci have a given amount of spacing in between, as is apparent from FIG. 9. However, in the direction from wide angle to telephoto, the focus lens that was at the convergence point is uncertain which locus to follow, and therefore focus cannot be maintained with a similar locus following method.

Therefore, Japanese Patent No. 2,795,439 (Claims, FIGS. 3 and 4, and the description thereof) discloses a control method (zigzag movement) wherein, using an AF evaluation value signal (sharpness signal) obtained from the high frequency component of the image signal by using a TV-AF method, when moving the zoom lens (variable power), the focus lens is forced to move so as to be off focus from the focus position, and further, performs repeated control of switching and moving the focus lens toward the direction of focus (changing the following speed to the locus), thereby correcting the following locus. Further, Japanese Patent No. 2,795,439 discloses a method of changing the increase/decrease cycle of the sharpness signal by means of changing the amount of change of the following speed corresponding to the subject, the focal point distance, and the depth of field, and attempts improvement of selection (generating) accuracy of the following locus selection.

The zigzag movement disclosed in the aforementioned Japanese Patent No. 2,795,439 specifies the following locus based on the change of the AF evaluation value. Further, the evaluation value changes not only according to the status of blurring of the image, but also changes according to the pattern changes of the subject. Therefore, considering that there may be cases wherein the focus lens movement switching is switched in the wrong direction, the correction range of the following locus is set as a wide range so as to be able to return to the correct locus even if initially moving in the wrong direction.

On the other hand, when the setting is for such a wide correction range, in the event that the movement deviates from the locus that should be used, the image may blur until moved back to the correct locus. Further, in the case of moving the focus lens in the wrong direction, image blurring may occur wherein the AF evaluation value level in particular is greatly decreased, or when image-taking a subject with low contrast, the correct locus may not be found, and there is the possibility that the image blur is carried all the way to the telephoto edge.

Further, in the case of image-taking a subject with a high frequency, when the following locus is trying to be set by means of the zigzag movement, arbitrary image blurring can occur. In order to make this type of image blurring less conspicuous, the AF evaluation value level, which determines the reverse timing of the drive direction of the focus lens wherein the zigzag movement can be adjusted according to the subject conditions, can be adjusted, but eliminating the occurrence of all image blurring of the subject related to the zigzag movement is difficult.

Further, with the TV-AF method, due to the signal detection cycle obtained by the AF evaluation value being a vertical synchronizing signal cycle, the sharpness of locus selection becomes poorer as the zooming speed becomes faster, and consequently, the rate of mistaken following locus selection increases.

SUMMARY OF THE INVENTION

It is an object of the present invention to provide a lens control device, optical equipment, and a lens control method for performing high quality zooming that is not affected by the photography scene or camera work, while maintaining a state of focus, even with a high speed zoom.

To this end, according to one aspect of the present invention, a lens control device, for controlling the driving of a second lens unit for correcting image movement in the event of movement of a variating first lens unit, comprises: a storage unit for storing data indicating the position of the second lens unit corresponding to the position of the first lens unit created for a predetermined focal distance; a control unit for generating information to control the driving of the second lens unit based on the data, and for controlling the driving of the second lens unit based on this information; and a distance detecting unit for detecting the distance to the focus object; wherein the control unit restricts the range of the generated information based on the detection results from the distance detecting unit.

According to another aspect of the present invention, a lens control method, for controlling the driving of a second lens unit for correcting image movement in the event of movement of a variating first lens unit, comprises: a storage step for storing data indicating the position of the second lens unit corresponding to the position of the first lens unit created for a predetermined focal distance; a control step for generating information to control the driving of the second lens unit based on the data, and for controlling the driving of the second lens unit based on this information; and a distance detecting step for detecting the distance to the focus object; wherein, in the control step, the range of the generated information is restricts based on the detection results from the distance detecting unit.

Here, the information may be locus information for showing the position of the second lens unit as relates to the first lens unit or a parameter for identifying this locus, or may be position information for driving the second lens unit.

According to another aspect of the present invention, a lens control device, for controlling the driving of a second lens unit for correcting image movement in the event of movement of a variating first lens unit, comprises: a storage unit for storing data indicating the position of the second lens unit corresponding to the position of the first lens unit created for a predetermined focal distance; a control unit for generating information to control the driving of the second lens unit based on the data, and for controlling the driving of the second lens unit based on this information; and a distance detecting unit for detecting the distance to the focus object; wherein the control unit controls the driving for the second lens unit to generate the information, and performs weighting based on the detection results from the distance detecting unit relating to the drive control.

According to another aspect of the present invention, a lens control method, for controlling the driving of a second lens unit for correcting image movement in the event of movement of a variating first lens unit, comprises: a storage step for storing data indicating the position of the second lens unit corresponding to the position of the first lens unit created for a predetermined focal distance; a control step for generating information to control the driving of the second lens unit based on the data, and for controlling the driving of the second lens unit based on this information; and a distance detecting step for detecting the distance to the focus object; wherein in the control step, the driving of the second lens unit for generating the information is controlled, and weighting is performed based on the detected distance, relating to the driving control.

Here, weighting may be weighting relating to the drive direction or drive speed of the second lens unit, or relating to the conditions for switching the driving conditions in the case of driving the aforementioned second lens unit while switching the driving conditions.

Further, the information may be locus information for indicating the position of the second lens unit as relates to the first lens unit or a parameter for identifying this locus, or may be a position information for driving the second lens unit.

Further objects, features and advantages of the imaging device, the focus control method, and the processing program, according to the present invention, will become apparent from the following description of the preferred embodiments with reference to the attached drawings.

BRIEF DESCRIPTION OF THE DRAWINGS

FIG. 12 is a diagram describing an example of a data table of the focus locus.

FIG. 14 is a conceptual diagram illustrating the underlying art of the present invention.

DESCRIPTION OF THE PREFERRED EMBODIMENTS

The preferred embodiments of the present invention will be described below with reference to the drawings.

(Underlying Art)

Prior to describing the embodiments of the present invention, the technology that is the premise to the present invention will be described.

Figure 10:
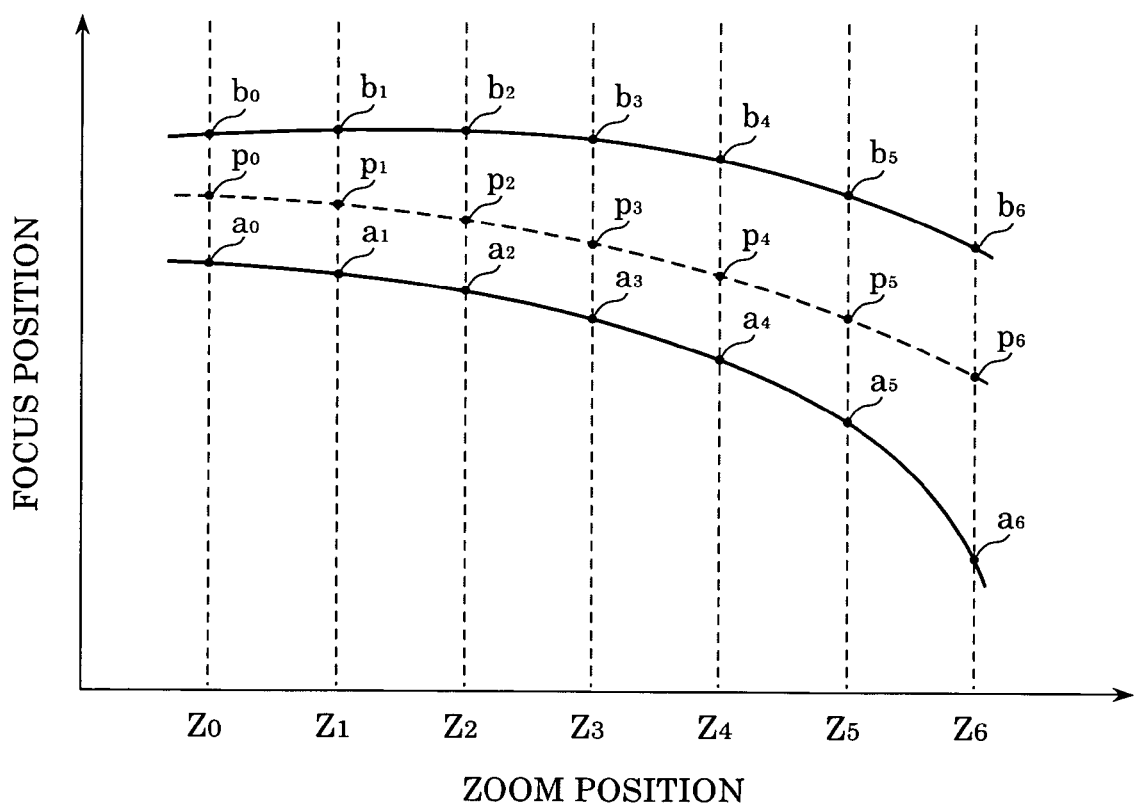
FIG. 10 is a diagram describing the focus locus.

FIG. 10 is a diagram for describing one example of the locus following method for a focus lens in an inner focus type lens system.

In FIG. 10, $Z_0, Z_1, Z_2, \ldots Z_6$ indicate the position of the zoom lens, and $a_0, a_1, a_2, \ldots a_6$ and $a_0, b_1, b_2, \ldots b_6$ indicate the position of the focus lens corresponding to the subject distance stored in an unshown microcomputer beforehand. The group of these focus lens positions ($a_0, a_1, a_2, \ldots a_6$ and $a_0, b_1, b_2, \ldots b_6$) becomes the focus loci that the focus lens of the representative subject distances should follow (representative locus).

Further, $p_0, p_1, p_2, \ldots p_6$ are the locations on the focus locus that the focus lens should follow, calculated based on the aforementioned two representative loci. The Equation for the positions on this focus locus will be illustrated below.

$$P_{(n+1)} = |p_{(n)} - a_{(n)}| / |b_{(n)} - (a)| \times |b_{(n+1)} - a_{(n+1)}| + a_{(n+1)} \quad (1)$$

According to the above Equation (1), for example in the case of FIG. 10 wherein the focus lens is at p0, the ratio wherein p0 internally divides the line segment $b_0$–$a_0$ is calculated, and the point that internally divides line segment $b_1$–$a_1$ according to this ratio is taken as $p_1$. From the difference in location of this $p_1$–$p_0$ and from the time required for the zoom lens to move from $Z_0$ to $Z_1$, the movement speed of the focus lens in order to maintain focus is determined.

Figure 11:
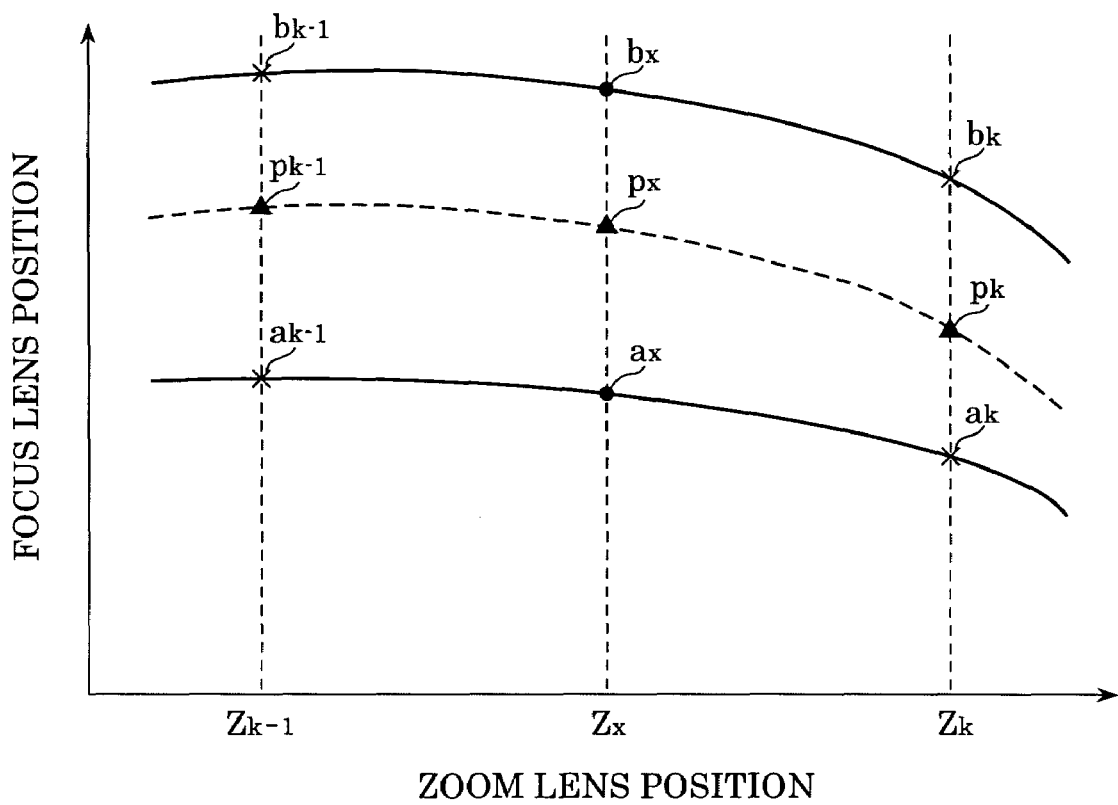
FIG. 11 is a diagram describing the interpolation of the movement direction of the zoom lens.

Next, a case in which the stopping position of the zoom lens is not restricted to the boundary of the zoom area that has the stored representative locus data will be described. FIG. 11 is a diagram for describing the interpolation method of the zoom lens movement direction, wherein one portion of FIG. 10 is extracted and the position of the zoom lens is arbitrary.

In FIG. 11, the vertical axis illustrates the focus lens position, and the horizontal axis illustrates the zoom lens position. When the zoom lens position is $Z_0, Z_1, \ldots Z_{k-1}, Z_k, \ldots Z_n$, the focus lens position on the representative locus stored in the microcomputer is, according to the subject distance, $a_0, a_1, \ldots a_{k-1}, a_k, \ldots a_n$ $b_0, b_1, \ldots b_{k-1}, b_k, \ldots b_n$ Now, in the case wherein the zoom lens position is at $Z_x$ which is not on the zoom area boundary, and the focus lens position is $P_x$, then $a_x$ and $b_x$ are calculated as follows:

$$a_x = a_k - (Z_k - Z_x) \times (a_k - a_{k-1}) / (Z_k - Z_{k-1}) \quad (2)$$

$$b_x = b_k - (Z_k - Z_x) \times (b_k - b_{k-1}) / (Z_k - Z_{k-1}) \quad (3)$$

In other words, following the current zoom lens position and the two zoom area boundary positions that are on either side (for example, $Z_k$ and $Z_{k-1}$ in FIG. 11) thereof and the division ratio obtained therefrom, $a_x$ and $b_x$ can be calculated by dividing those with the same subject distance of the stored four representative locus data ($a_k, a_{k-1}, b_k, b_{k-1}$ in FIG. 11) using the above-described division ratio.

Next, following the division ratio obtained from $a_x$, $p_x$, and $b_x$, $p_k$ and $p_{k-1}$ can be calculated by dividing that of the previously stored aforementioned four representative data with identical focal distance, by the above-described division ratio as in Equation (1).

Then, when zooming from wide angle to telephoto, the movement speed of the focus lens in order to maintain focus is determined from the difference in focus position $p_k$ where the following movement is headed, and the current focus position $p_x$, and from the time required for the zoom lens to move from $Z_x$ to $Z_k$.

Further, when zooming from telephoto to wide angle, the movement speed of the focus lens in order to maintain focus is determined from the difference in focus position $p_{k-1}$ where the following movement is headed, and the current focus position $p_x$, and from the time required for the zoom lens to move from $Z_x$ to $Z_{k-1}$.

FIG. 12 illustrates an example of the table data of the focus locus information stored in the microcomputer beforehand. FIG. 12 illustrates the focus lens position data $A_{(n, v)}$ based on subject distance, which changes according to the zoom lens position. The subject distance changes with according to a variable n in the row direction, and the zoom lens position (focal distance) changes according to a variable v in the column direction. Here, n=0 denotes an infinitely distant subject distance, and as n grows larger, the subject distance changes towards the greatest close-up distance side. n=m indicates a subject distance of 1 cm. On the other hand, v=0 denotes the wide-angle end. Further, as v grows larger and the focal distance increases, v=s denotes the zoom lens position on the telephoto end. Therefore, one row of table data plots one representative locus.

Next, as described above, a locus following method will be described for solving the problem wherein the focus lens cannot find which locus to follow when zooming from the wide angle to the telephoto direction.

Figure 13A:
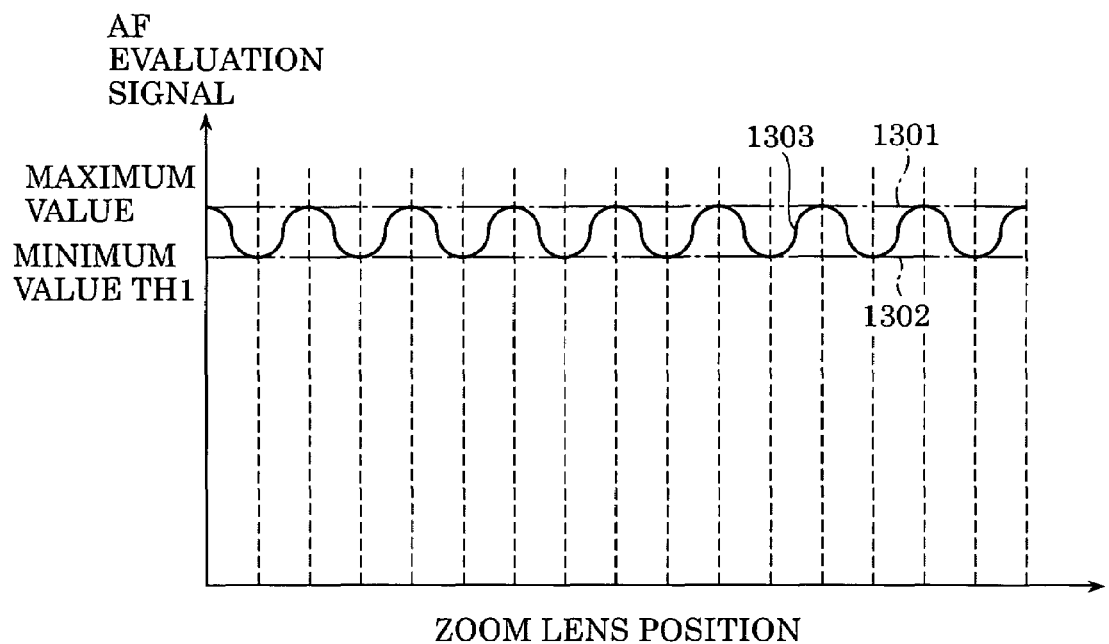
FIGS. 13A and 13B are both conceptual diagrams illustrating the underlying art of the present invention.
Figure 13B:
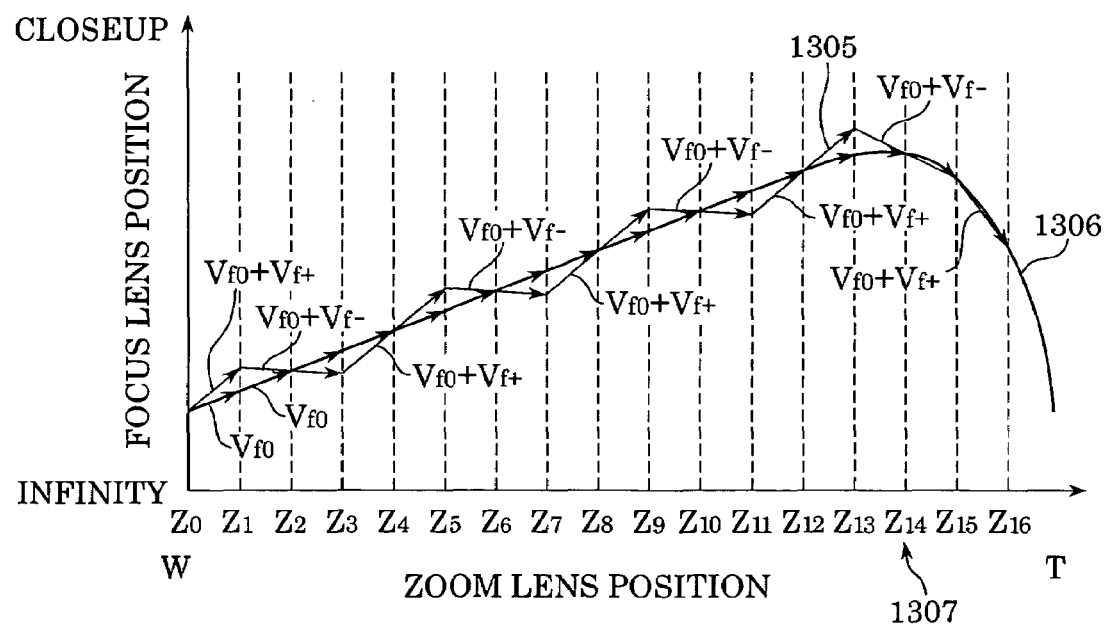

In FIGS. 13A and 13B, the horizontal axis illustrates the position of the variable power lens. Further, the vertical axis in FIG. 13A illustrates the AF evaluation signal obtained from the imaging signal by means of the TV-AF Equation. This AF evaluation signal illustrates the level of the high frequency components of the imaging signal (the sharpness signal). Further, the horizontal axis in FIG. 13B illustrates the focus lens position. In FIG. 13B, reference numeral 1304 denotes the cam locus (grouping of the focus lens positions) that the focus lens should travel when zooming while obtaining focus of the subject at a given distance position.

Here, the standard movement speed for focus locus following when further at the wide angle side than the zoom lens position 1306 ($Z_{14}$) is made to be positive (moving in the direction of focus lens close-up), and the standard movement speed for focus locus following when moving in the infinitely distant direction when further at the telephoto side than the position 1306 is made to be negative. As the focus lens moves over the target locus 1304 while maintaining focus, the strength of the AF evaluation signal becomes the level denoted by 1301 in FIG. 13A. Generally, with zooming wherein focus is maintained, the AF evaluation signal is approximately a set value.

In FIG. 13B, the standard movement speed of the focus lens that traces the target locus 1304 while zooming is $V_{f0}$. The actual focus lens movement speed is $V_f$, and in the event of zooming while increasing and decreasing this movement speed $V_f$ compared to the standard movement speed $V_{f0}$, the locus thereof becomes a zigzag locus as in 1305 (hereafter, this is called "zigzag correction operation").

At this time, the AF evaluation signal level changes so as to produce mountains and valleys as indicated by 1303 in FIG. 13A. Here, at the position wherein the target locus 1304 and the actual zigzag locus 1305 intersects, the AF evaluation signal level 1303 becomes the greatest level 1301 (the even-numbered points of $Z_0, Z_1, Z_2, \ldots Z_{16}$), and at the odd-numbered points of $Z_0, Z_1, Z_2, \ldots Z_{16}$ wherein the movement direction vector of the actual locus 1305 switches, the AF evaluation signal level 1303 becomes the smallest level 1302.

Then, conversely, if the value TH1 of the smallest level 1302 of the AF evaluation signal level 1303 is set in advance (in other words, the focus tolerance is set wherein the AF evaluation signal of the smallest level TH1 that can be considered to be focused is the lower limit), and if the movement direction vector of the locus 1305 is switched each time the AF evaluation signal level 1303 becomes the same size as TH1, the focus lens movement direction after switching can be set in the direction closer to the target locus 1304. In other words, whenever the image is blurred by the difference of the greatest level 1301 and the smallest level 1302 (TH1) of the AF evaluation signal, zooming can be performed while controlling the occurrence of blurring by controlling the drive direction and drive speed which are drive conditions for the focus lens to reduce this blurring.

Figure 9:
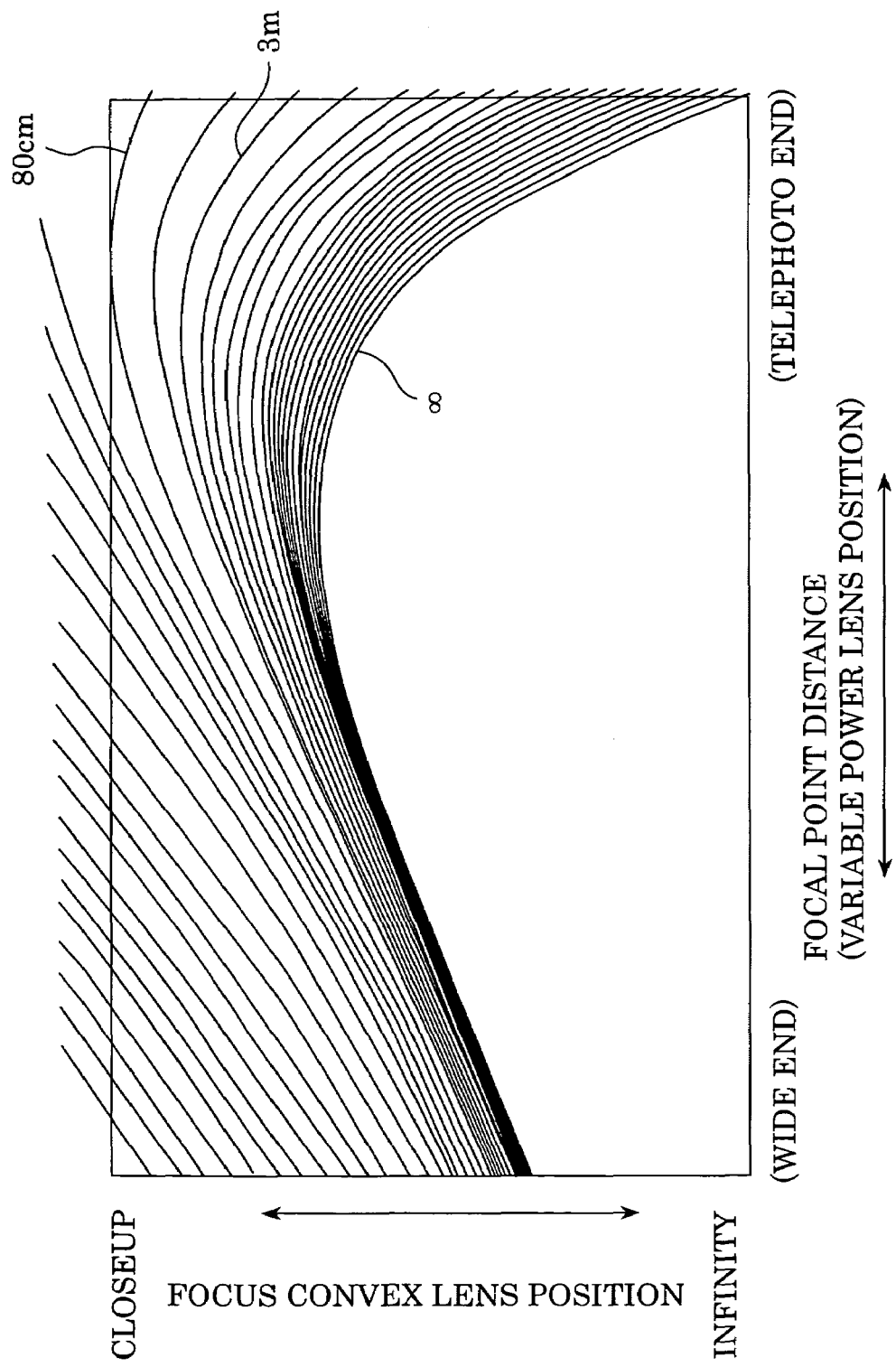
FIG. 9 is a conceptual diagram illustrating the focus locus corresponding to the conventional subject distance.

By using this type of method, as illustrated in FIG. 9, with zooming from wide angle to telephoto wherein the focus loci of different subject distances spread out from convergence, even if the standard movement speed $V_{f0}$ that maintains focus is not the most appropriate for the subject distance at that time, the movement speed $V_f$ can be controlled against the standard movement speed (calculated using $P_{(n+1)}$ obtained from Equation (1)), and by repeating the switching operation indicated in locus 1305 according to the changes of the AF evaluation signal level, focus locus re-identifying (re-generating) can be performed without the AF evaluation signal level moving below the smallest level 1302 (TH1), in other words, without producing any more than a predetermined amount of blurring. Further, by setting TH1 appropriately, zooming is realized wherein the blurring is imperceptible to the naked eye.

Here, with the focus lens movement speed $V_f$ compared to the standard movement speed set at $V_{f+}$ for the positive direction correction speed, and at $V_{f-}$ for the negative direction correction speed, $$V_f = V_{f0} + V_{f+} \quad (4)$$

or $$V_f = V_{f0} + V_{f-} \quad (5)$$

hold. At this time, the correction speeds $V_{f+}$ and $V_{f-}$ are determined by the direction vector of $V_{f0}$ so as to equally divide the interior angle of the two $V_f$ direction vectors obtained by Equations (4) and (5), so as not to produce any imbalanced selection of the following locus according to the aforementioned zooming method.

The zooming control described above generally performs processing synchronizing to the image vertical synchronizing signal, from the relationship wherein the focus detection is performed using the imaging signal from the imaging device.

Figure 7:
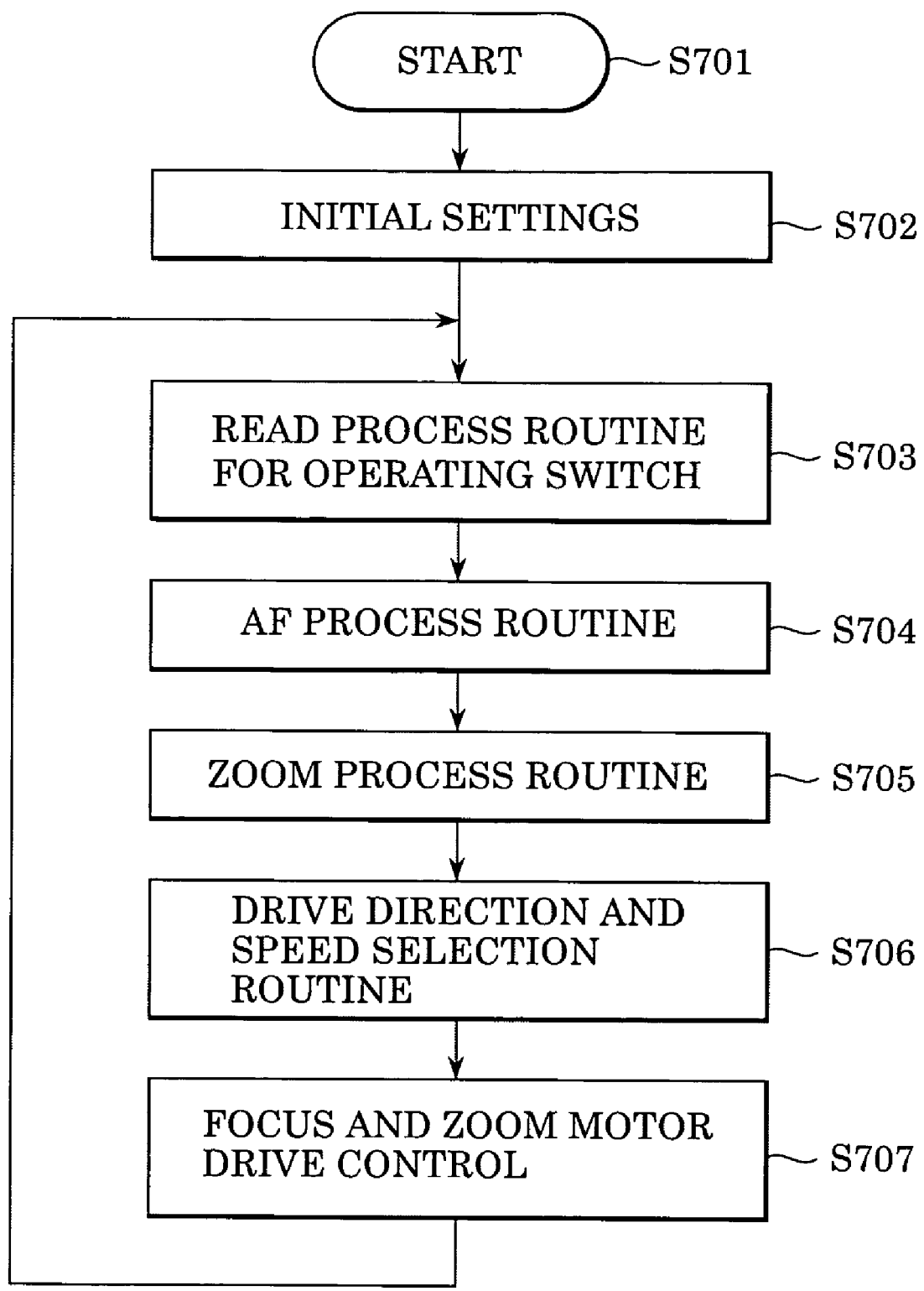
FIG. 7 is a flowchart illustrating the underlying art of the present invention.
Figure 8:
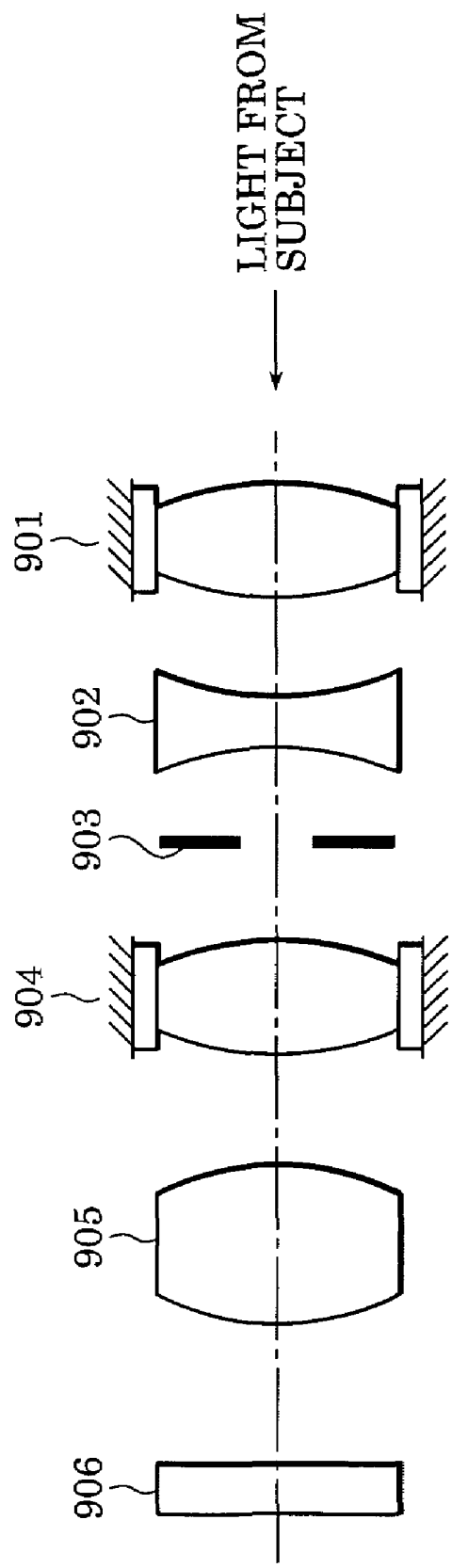
FIG. 8 is a conceptual diagram illustrating the configuration of a conventional photography optical system.

FIG. 7 is a flowchart of the zooming control performed within the microcomputer. Upon processing beginning in step S701, initial settings are made in S702. At the time of initialization, the RAM within the microcomputer and each port is initialized.

In S703, the state of the camera main unit operating system is detected. The microcomputer receives the information of the zoom switch unit for the photographer to operate here, and displays the variable power operation information such as the zoom lens position on the display to advise the photographer that it is in the process of zooming. In S704, AF processing is performed. In other words, automatic focus adjustment processing is performed corresponding to the changes in the AF evaluation signal.

In S705, zooming processing is performed. In other words, the processing is performed for the compensator operation for maintaining the focus while zooming. Specifically, calculations are performed for the focus lens standard drive direction and standard drive speed, in order to trace the locus illustrated in FIG. 10 closely.

S706 is a routine that selects which to use of the drive direction or drive speed of the zoom lens or focus lens, that were calculated in the S704 to S705 processing routine, in the case of AF or zooming, and drives the zoom lens and focus lens between the telephoto edge and wide angle edge, or between the close-up edge and the infinity edge, under control provided by software so as not to hit the mechanical edge.

In S707, a control signal is output to the motor driver, corresponding to the drive direction information and drive speed information for zooming and focusing determined in S706, and controls the drive/stop of the lens. After completing processing in S707, the flow returns to S703. The series of processes illustrated in FIG. 7 is performed synchronously with the vertical synchronizing signal (stands by in the processing of S703 until the next vertical synchronizing signal is input).

FIGS. 3A through 4B illustrate the control flow executed within the microcomputer once every vertical synchronizing signal, and illustrate in detail the content of the processing executed in S705 of FIG. 7. Now, In FIGS. 3A through 4B, the portions indicated by the same circled numeral are connected to one another.

The descriptions below will make reference to FIG. 5 through FIG. 7, and FIG. 10.

Figure 5:
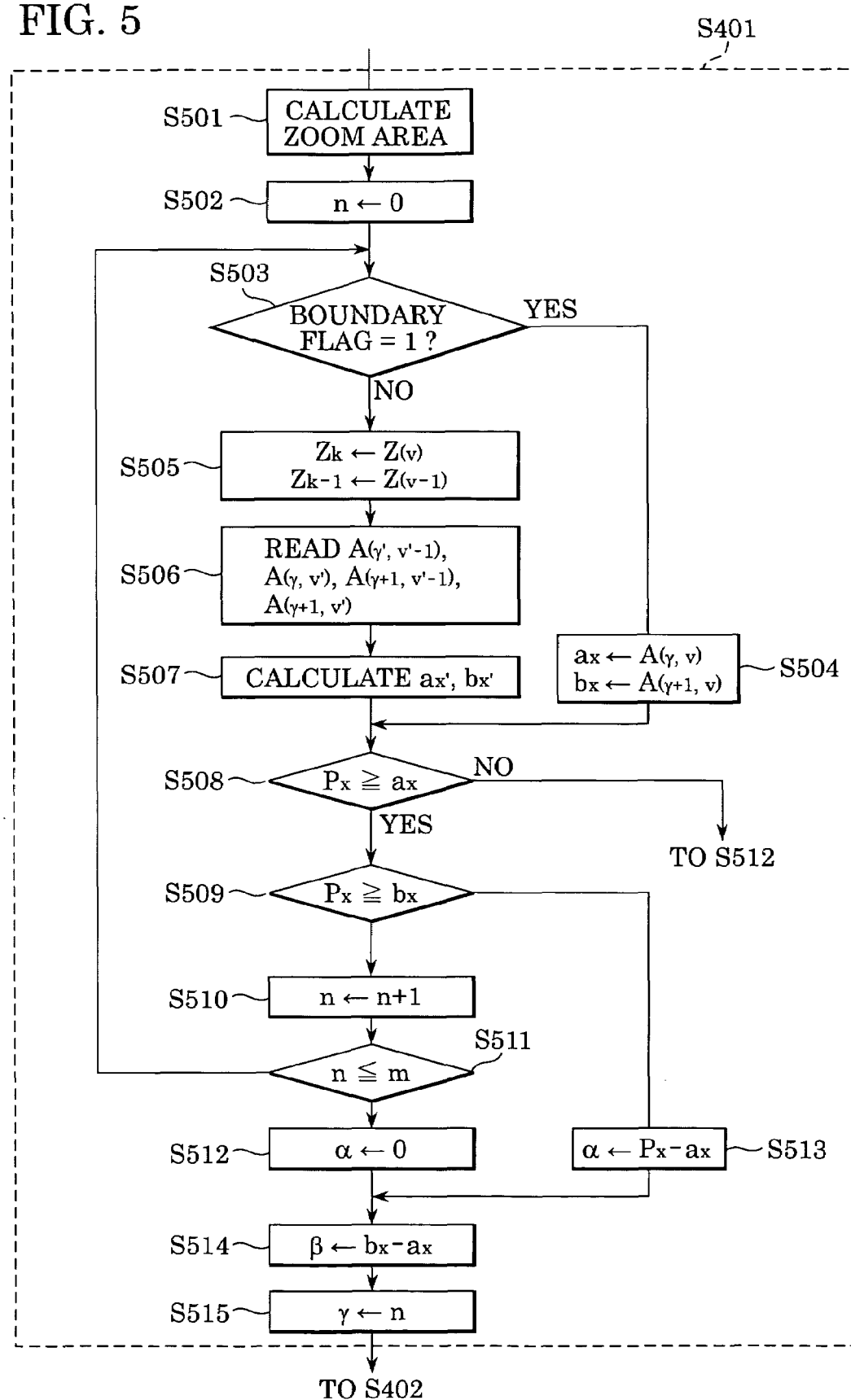
FIG. 5 is a flowchart illustrating the underlying art of the present invention.

In S400 in FIG. 5, the drive speed Zsp of the zoom motor is set so as to perform natural zooming operations, corresponding to the operation information of the zoom switch unit.

In S401, the distance from the current position of the zoom lens and focus lens to the subject (subject distance) is identified (estimated), and that subject distance information is stored memory region such as RAM, as three locus parameters (data for obtaining the target position information) α, β, and γ. Here, the processing illustrated in FIG. 5 is performed. Now, in order to simplify the description, the processing illustrated in FIG. 5 will be described as if the focus state is maintained at the current lens position.

In S501 of FIG. 5, with the wide angle edge to the telephoto edge in the data table illustrated in FIG. 12 divided into s equal segments, at which zoom area v the current zoom lens position $Z_x$ is currently located, is calculated.

In S601, the zoom area variable v is cleared. In S602, the zoom lens position $Z_{(v)}$ on the boundary of the zoom area v is calculated, according to the following Equation (6). This $Z_{(v)}$ is equal to the zoom lens position $Z_0, Z_1, Z_2, \ldots$ illustrated in FIG. 10.

$Z_{(v)}$=(telephoto edge zoom lens position−wide angle edge zoom lens position)×$v/s$+wide angle zoom lens position  (6)

In S603, whether the $Z_{(v)}$ obtained in S602 is equal to the current zoom lens position $Z_x$ is determined. If equal, in S607, 1 is raised as the boundary flag, as the zoom lens position $Z_x$ is positioned on the boundary of the zoom area v.

If not equal in S603, in S604 whether $Z_x < Z_{(v)}$ is determined. If Yes in S604, then $Z_x$ is between $Z_{(v-1)}$ and $Z_{(v)}$, and the boundary flag in S606 is 0. If No in S604, then in S605 the zoom area v is incremented and the flow returns to S602.

Figure 6:
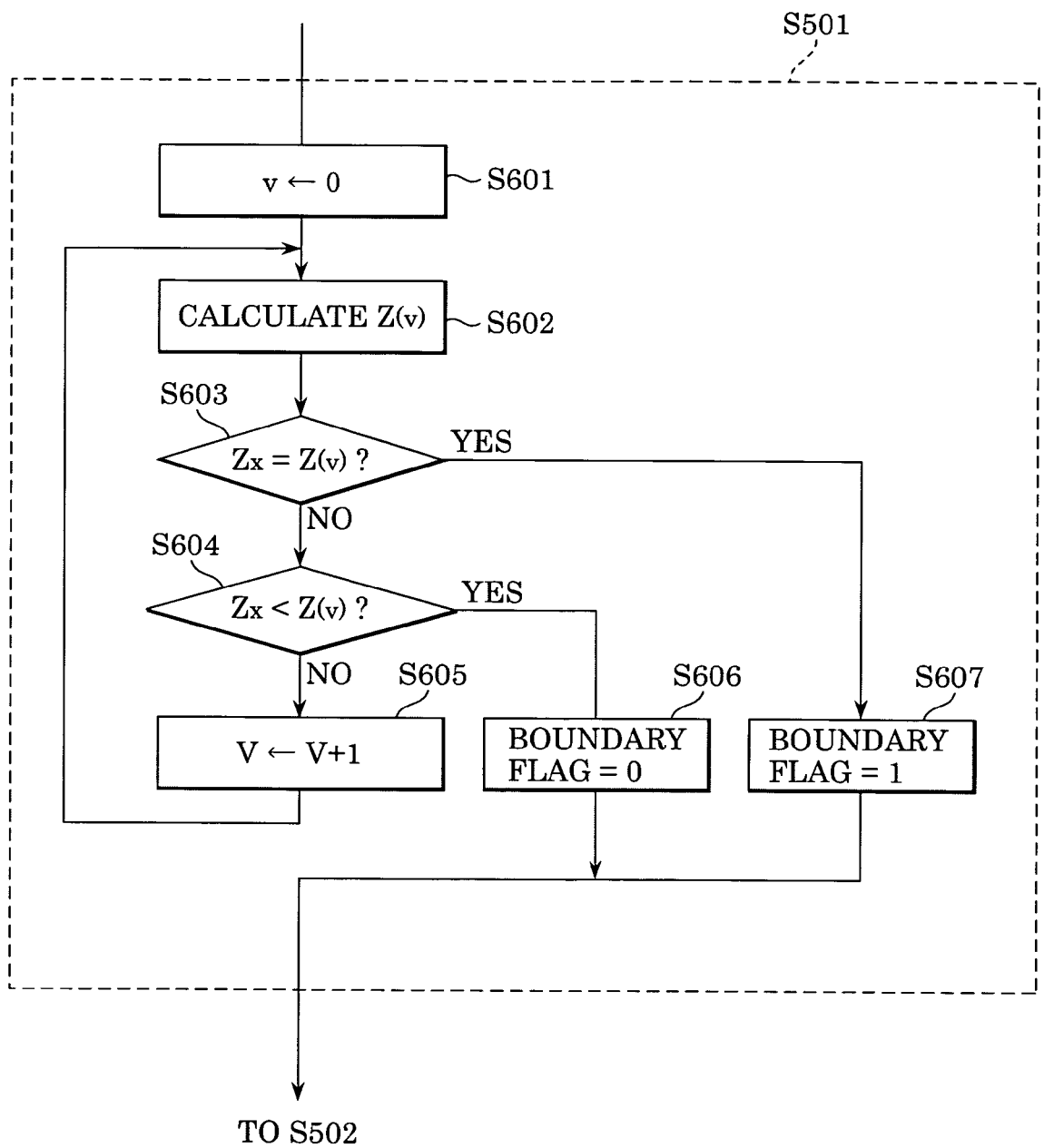
FIG. 6 is a flowchart illustrating the underlying art of the present invention.

By repeating the above process, whether or not the current zoom lens position $Z_x$ exists in the v=k'th zoom area on the data table in FIG. 12, and whether or not $Z_x$ is on the zoom area boundary, can be told at the time of completing the flow shown in FIG. 6.

Returning to FIG. 5, the current zoom area is set in S501 by the process in FIG. 6, and according the following process calculates where on the data table in FIG. 12 the focus lens is positioned.

First, in S502 the subject distance variable n is cleared, and in S503 whether the current zoom lens position exists on the boundary of the zoom area is determined. If the boundary flag is 0, it is assumed not to be on the boundary, and the flow continues to the process starting at S505.

In S505, $Z_{(v)}$ is set for $Z_k$, and further $Z_{(v-1)}$ for $Z_{k-1}$. Next, in S506, the four table data sets $A_{(n, v-1)}$, $A_{(n, v)}$, $A_{(n+1, v-1)}$, $A_{(n+1, v)}$ are read out, and in S507 $a_x$ and $b_x$ are calculated from the above-described Equations (2) and (3).

On the other hand, in the event that S503 determines the boundary flag to be 1, in S504 the focus position $A_{(n, v)}$ corresponding to the zoom lens position (v in this case) of the subject distance n, and $A_{(n+1, v)}$ corresponding to the zoom lens position of the subject distance n+1, are called up and each stored in memory as $a_x$ and $b_x$, respectively.

In S508 whether the current focus lens position $p_x$ is greater than $a_x$ is determined. If greater than $a_x$, in S509 whether or not the current focus lens position $p_x$ is greater than $b_x$ is determined. If not greater than $b_x$, the focus lens position $p_x$ is determined to be between the subject distances n and n+1, and the locus parameters at this point are recorded in memory from S513 to S515. At S513, $\alpha = p_x - a_x$, at S514, $\beta = b_x - a_x$, and at S515, $\gamma = n$.

S508 is negative in the case that the focus lens position $p_x$ is at the far infinite distance position. At this time, in S512 $\alpha = 0$ is set and continued from the process of S514, and the locus parameter for infinite distance is stored in memory.

S509 is positive in the case that the focus lens position $p_x$ is at the far close-up position, and in this case, in S510 the subject distance n is incremented, and in S511 whether n is on the side of infinite distance from the position m corresponding to the far close-up distance is determined. If to the side of infinite distance from the far close-up distance position m, the flow returns to S503. S511 is negative in the case that the focus lens position $p_x$ is at the far close-up position, and the locus parameters for the far close-up distance are stored in memory by continuing from the process starting at S512 at this time.

Returning to FIG. 4A, in S401, the locus parameters is stored in memory in order to know which position on the locus illustrated in FIG. 9 the current zoom lens position and the focus lens position are located.

In S402, the zoom lens position $Z_x'$ (the target position from the current position) wherein the zoom lens will arrive after one vertical synchronizing period (1V), is calculated. Here, if the zoom speed determined in S400 is Zsp (pps), the zoom lens position $Z_x'$ after one vertical synchronizing period can be found from the Equation (7) below. A pps is an increment of the rotation speed of the stepping motor, and denotes the step amount (1 step=1 pulse) of rotation during 1 second. Further, the symbols in Equation (7) represent the movement direction of the zoom lens, + meaning the telephoto direction and − meaning the wide angle direction.

$$Z_x' = Z_x \pm Zsp/\text{vertical synchronizing frequency} \quad (7)$$

Next, S403 determines which zoom area v' wherein $Z_x'$ exists. In S403, the same process as the process in FIG. 6 is performed, and $Z_x$ in FIG. 6 is substituted with $Z_x'$, and v with v'.

Next, in S404, whether the zoom lens position $Z_x'$ after one vertical synchronizing period exists on the zoom area boundary is determined, and if the boundary flag=0, the zoom lens position $Z_x'$ is not considered to be on the boundary, and the flow continues from the process starting in S405.

In S405, $Z_k \leftarrow Z_{(v')}$, and $Z_{k-1} \leftarrow Z_{(v'-1)}$ are set. Next, in S406, the four table data sets $A_{(\gamma, v'-1)}$, $A_{(\gamma, v')}$, $A_{(\gamma+1, v'-1)}$, $A_{(\gamma+1, v')}$ wherein the subject distance γ is specified by the process in FIG. 5, and calculates $a_x'$ and $b_x'$ from the Equations (2) and (3) described above in S407. On the other hand, in the case that S403 yields Yes, in S408 the focus position $A_{(\gamma, v')}$ corresponding to the zoom area v' of the subject distance γ, and the focus position $A_{(\gamma+1, v')}$ corresponding to the zoom area v' of the subject distance γ+1 are called up, and stored in memory as $a_x'$ and $b_x'$, respectively.

Then in S409, the focus lens focus position (target position) $p_x'$ when the zoom lens position has reached $Z_x'$ is calculated. Using Equation (1), the following target position after one vertical synchronizing period can be expressed as follows.

$$P_x' = (b_x' - a_x') \times \alpha/\beta + a_x' \quad (8)$$

Therefore, the difference ΔF of the following target position and the current focus lens position becomes $$\Delta F = (b_x' - a_x') \times \alpha/\beta + a_x' - P_x$$

Next, in S410 the focus standard moving speed $V_{f0}$ is calculated. $V_{f0}$ is obtained by subtracting the focus lens position difference ΔF from the movement time of the zoom lens required to move this distance.

The calculation method for the correcting speed for performing the focus lens movement speed correction (zigzag operation) illustrated in FIG. 13B will be described below.

In S411, each parameter is initialized, and the "reversal flag" used in the later processes is cleared. S412 calculates the correction speed $V_{f+}$ and $V_{f-}$ for the "zigzag correction operation" from the focus standard movement speed $V_{f0}$ obtained in S410.

Here, the correction amount parameter δ and the correction speeds $V_{f+}$, $V_{f-}$ are calculated as follows. FIG. 14, which is a diagram to describe the calculation method of the correction speeds $V_{f+}$ and $V_{f-}$ corresponding to the correction amount parameter δ, illustrates the zoom lens position on the horizontal axis, and the focus lens position on the vertical axis. 1304 is the target locus to be followed.

Now, the focus speed at which the focus lens position changes by an amount of y when the zoom lens position changes by an amount of x, (in other words, arrives at the target position), is the standard speed $V_{f0}$ calculated in 1403. The focus speed at which the focus lens position changes by an amount of n or m, with displacement y as a reference, when the zoom lens position changes by an amount of x, is the correction speed $V_{f+}$ and $V_{f-}$ to be calculated. Here, n and m are determined so that the direction vector 1401 of the speed to drive closer to the close-up side than the displacement y (the speed wherein the correction speed $V_{f+}$ is added to the standard speed $V_{f0}$ in the positive direction), and the direction vector 1402 of the speed to drive closer to the infinite distance side than the displacement y (the speed wherein the correction speed $V_{f-}$ is added to the standard speed $V_{f0}$ in the negative direction), have direction vectors separated equal angles δ as to the direction vector 1403 of the standard speed $V_{f0}$.

First, m and n are obtained. From FIG. 14 in diagram form, $$\tan\theta = y/x, \tan(\theta \cdot \delta) = (y \cdot m)/x, \tan(\theta + \delta) = (y + n)/x \quad (9)$$

Further, $$\tan(\theta \pm \delta) = (\tan\theta \pm \tan\delta)/\{1 \pm (-1) \times \tan\theta \times \tan\delta\} \quad (10)$$

Further, from Equations (9) and (10), $$m = (x2 + y2)/(x/k + y) \quad (11)$$

$$n = (x2 + y2)/(x/k \cdot y) \quad (12)$$

wherein $\tan\delta = k$ whereby n and m can be calculated.

Here the correction angle δ is a variable for parameters such as the depth of the subject field depth or focal distances.

By using this, the increase/decrease cycle of the AF evaluation signal level that changes corresponding to the focus lens drive state can be kept constant as to the assigned focus lens position change amount, and the possibility of missing the focus locus that the focus lens should be following during the zooming can be reduced.

Within the memory of the microcomputer according to the value of $\delta$, the value of k is stored as the data table, and by reading out as necessary, the Equations (11) and (12) are calculated.

Here, in the case that the zoom lens position changes by an amount of x each time unit, Zoom speed Zsp=x, Focus standard speed $V_{f0}$=y, and Correction speed $V_{f+}$=n, $V_{f-}$=m hold, and the correction speeds $V_{f+}$ and $V_{f-}$ (negative speed) are obtained by Equations (11) and (12).

In S413, whether or not zooming is being performed is determined, according to the information illustrating the operational state of the zoom switch unit obtained in S703 of FIG. 7. In the event that zooming is being performed, the process starting at S416 is carried out. In the event that zooming is not being performed, a value TH1 is set, wherein a arbitrary constant μ is subtracted from the current value of the AF evaluation signal level at S414. This TH1 determines the AF evaluation signal level that is the switchover base point for the correction direction vector (switchover base point for the zigzag correction operation), as described in FIG. 13A. This TH1 is to be determined immediately prior to the start of zooming, and corresponds to the smallest level of 1302 in FIG. 13A.

Next, in S415 the correction flags are cleared, and this process ends. Here, the correction flag is a flag indicating whether the locus following state is under correction in the positive direction (correction flag=1) or under correction in the negative direction (correction flag=0).

In the event that S413 determines that zooming is being performed, determination is made whether or not the zooming direction is from wide angle to telephoto in S414. If from telephoto to wide angle, in S419 $V_{f+}$=0 and $V_{f-}$=0 is set, and the processing starting from S420 is performed. If from wide angle to telephoto, in S417 whether or not the current AF evaluation signal level is smaller than TH1 is determined. If TH1 or greater, the flow continues to S420, and if smaller than TH1, in S418 the reversal flag is set to 1 to perform correction direction switching since the current AF evaluation signal level has dropped to below the TH1 (1302) level in FIG. 13.

In S420, whether the reversal flag is 1 is determined, and in the event that the reversal flag=1, then in S421 whether the correction flag is 1 is determined. If the correction flag is not 1 in S421, then in S424 the correction flag is set to 1 (correction state in the positive direction). Further, according to Equation (4), focus lens movement speed $V_f=V_{f0}+V_{f+}$ (wherein $V_{f+}\geq 0$).

On the other hand, if the correction flag=1 in S421, then in S423 the correction flag is set to 0 (correction state in the negative direction), and according to Equation (5), focus lens movement speed $V_f=V_{f0}+V_{f-}$ (wherein $V_{f-}\geq 0$).

Further, in the event that the reversal flag is not 1 in S420, S422 determines whether the correction flag=1. If the correction flag=1 the flow continues to S424, and if not, the flow continues to S423.

After completing this process, in S706 in FIG. 7 the focus lens and zoom lens drive direction and drive speed are selected, according to the operation mode. In the case of zooming operation, the focus lens drive direction is set to the close-up direction or the infinite distance direction, depending on whether the focus lens movement speed $V_f$ obtained in S423 or S424 is positive or negative. Thus, the locus to be traced is re-identified as the focus lens zigzag driving is performed.

The above-described is the underlying conventional art upon which the present invention has been made, and the description below will be made primarily contrasting the embodiments of the present invention with the conventional art.

First Embodiment

Figure 1:
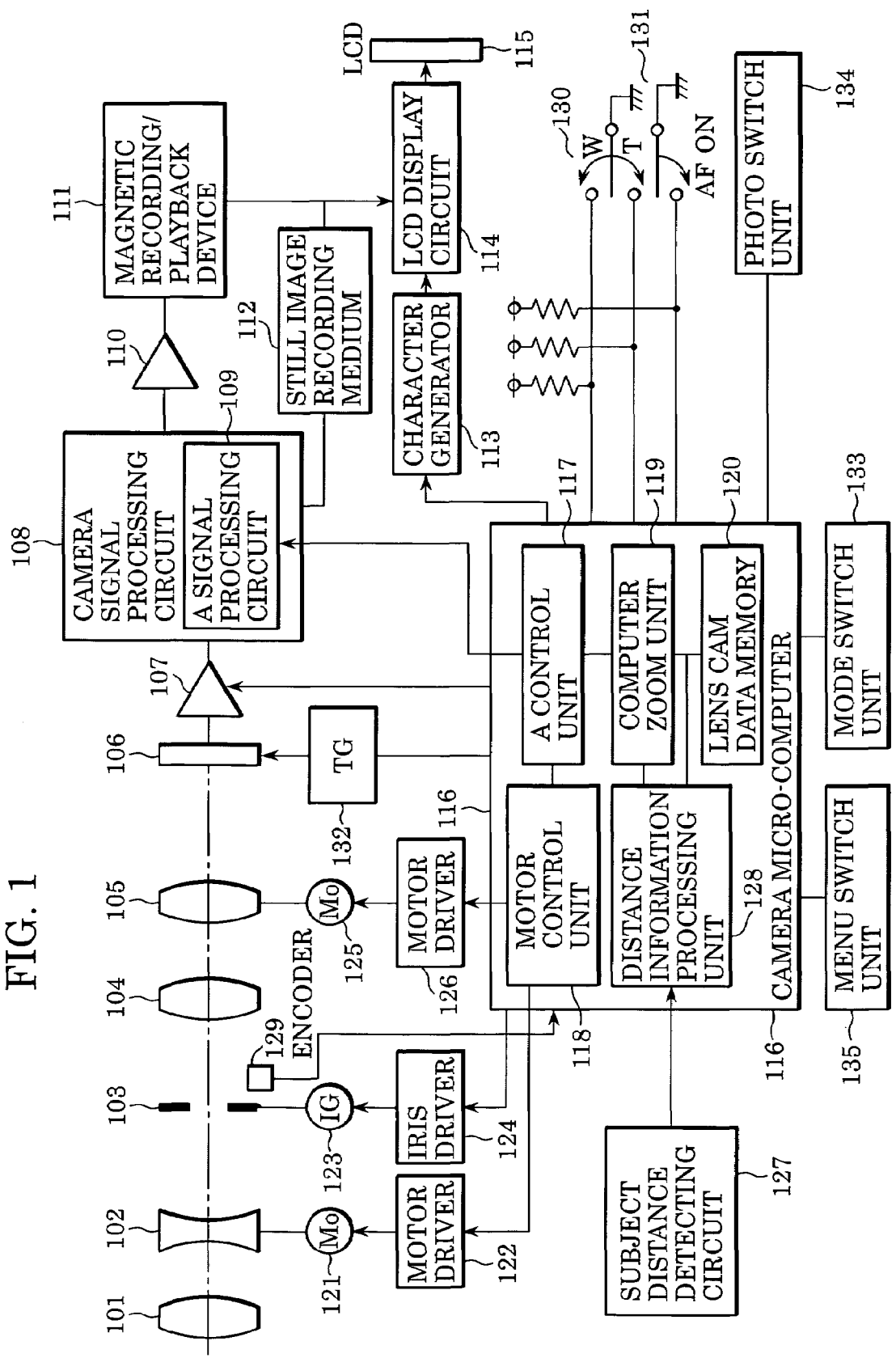
FIG. 1 is a block diagram of the configuration of a video camera according to first, second, and third embodiments.

FIG. 1 shows an embodiment according to the present invention of an imaging device (optical device) provided with a lens control device, as the configuration of a video camera. Now, the present embodiment describes an example applying the present invention to an imaging device with non-interchangeable image-taking lens, however the present invention can also be applied to an interchangeable lens (optical equipment) of an imaging system possessing an interchangeable lens and the camera main unit to which this is attached. In this case, a microcomputer within the lens performs the later-described zooming operation in response to a signal that is sent from the side of the camera main unit. Further, the present invention is not limited to a video camera, and may be used for a digital camera or various imaging devices.

In FIG. 1, in order from the object side, reference numeral 101 denotes a fixed front lens unit 101, 102 denotes a zoom lens unit (first lens unit) that performs variation by moving along the optical axis, 103 denotes an aperture diaphragm, 104 is a fixed lens unit that is fixed, 105 denotes a focus lens unit (second lens unit), which provides a focus adjusting function and a compensator function that corrects the image movement from the variator, moving along the optical axis. The image-taking optical system configured of these lens units is a rear focus optical system configured of four lens units possessing the optical power of positive, negative, positive, positive in order from the object side (left side of diagram). Now, the diagram is drawn showing one lens making up each lens unit, but in actuality, each lens unit may be made up of either a single or multiple lenses.

Reference numeral 106 is a imaging device, such as a CCD or a CMOS sensor. The light flux from an object that passes through the image-taking optical system forms an image on the imaging device 106. The imaging device 106 takes the formed object image and performs photoelectric conversion, and outputs image-taking signals. The image-taking signals are amplified to the optimum level with an amplifier (AGC) 107 and input into the camera signal processing circuit 108. The camera signal processing circuit 108 outputs the input imaging signal to the amplifier 110 after the input imaging signal is converted to a standard television signal. The television signal that is amplified to the optimum level by the amplifier 110 is output to a magnetic recording/playing device 111, and is recorded on a magnetic recording medium such as a magnetic tape. Or, other different recording media may be used, such as semiconductor memory or an optical disk.

Further, the television signal amplified by the amplifier 110 is also sent to a LCD display circuit 114, and is displayed on a LCD 115 as a taken image. Now, the LCD 115 also displays images such as the photography mode, image-taking conditions, warnings, etc., to be communicated to the user. Such images are superimposed on the taken image and displayed, by means of a camera microcomputer 116 controlling a character generator 113, and mixing the output thereof with television signals on the LCD display circuit 114.

On the other hand, the imaging signals input to the camera signal processing circuit 108 can be simultaneously compressed with internal memory and stored on a still image recording medium 112 such as a card medium.

Further, the imaging signal input into the camera signal processing circuit 108 is also input into an AF signal processing circuit 109 as a focus information production means. The AF evaluation value signal (focus signal) that is formed in the AF signal processing circuit 109 is read out as data through transmission with a camera microcomputer 116.

Further, the camera microcomputer 116 reads in the zoom switch 130 and AF switch 131 states, and further detects the state of the photo switch 134.

In the state wherein the photo switch 134 is pressed halfway, the focus operation by the AF begins, and locks the focus when at a focused state. Further, in the fully pressed (deep press) state, this locks the focus regardless of whether in focus or out of focus, reads images into the memory (not shown) within the camera signal processing circuit 108, and performs still image recording to the magnetic tape or still image recording medium 112.

Now, the camera microcomputer 116 determines whether to use a moving-image image-taking mode or a still-image image-taking mode, according to the state of the mode switch 133, and controls the magnetic recording/playing device 111 or still image recording medium 112 via the camera signal processing circuit 108. Thus, suitable television signals are provided to the recording medium, or in a case wherein the mode switch 133 is set to the playing mode, playing control of the recorded television signals from the magnetic recording/playing device 111 or still image recording medium 112 is performed.

A computer zoom unit (control means) 119 that is within the camera microcomputer 116 outputs a signal to the zoom motor driver 122 by the program within the computer zoom unit 119 wherein the AF switch 131 is off and the zoom switch 130 is operating, for driving the zoom lens unit 102 in the telephoto or wide angle direction corresponding to the operational direction of the zoom switch 130. The zoom motor driver 122 receives this signal and drives in this direction of the zoom lens unit 102 via the zoom motor 121. Further at this time, the computer zoom unit 119 drives a focus motor 125 via a focus motor driver 126, based on the lens cam data (representative locus data or locus parameter data according to the multiple subject distances, as illustrated in FIG. 11) previously stored in cam data memory 120, and drives the focus lens unit 106 so as to correct the image movement that accompanies zooming.

Further, an AF control unit 117 in the camera microcomputer 116 drives the zoom lens unit 102 and focus lens unit 105 based on the distance information to the subject (focus object) obtained from the output of the subject distance detecting circuit 127 or the AF evaluation signal that is sent from the AF signal processing circuit 109, wherein the AF switch 131 is on and the zoom switch 130 is operating, a variating operation is necessary to maintain the focus state, and therefore the computer zoom unit 119 sends also the lens cam data stored on the cam data unit 120 through the internal program.

Now, the output signal from the subject distance detecting circuit 127 is calculated and processed at the distance information processing unit 128 within the camera microcomputer 116, and is output to the computer zoom unit 119 as the subject distance information.

Further, in the event that the AF switch 131 is on and the zoom switch 130 is not operating, the AF control unit 117 outputs a signal to the focus motor driver 126 to drive the focus lens 105 so as to make the AF evaluation value signal sent from the AF signal processing circuit 109 as great as possible, and drives the focus lens unit 105 via the focus motor 125. Thus, the automatic focus adjusting operation is performed.

Here, the subject distance detecting circuit 127 measures the distance to the subject with triangulation using an active sensor, and outputs the distance information that is the measurement result thereof. The active sensor in this case can be an infrared sensor that is widely used in compact cameras.

Now, the present embodiment is described with the example of performing distance detection using triangulation, but other distance detection methods can also be used for the present invention. For example, distance detection with phase-difference detection can also be used. In this case, for example, an element (half prism or half mirror) is provided to divide the light that passes through the exit pupil of the image-taking lens (i.e., TTL (Through The Lens) method), the light exited from this element is guided to no fewer than two line sensors via a sub mirror or image forming lens, and by taking the correlation of the output of these line sensors, the offset direction and offset amount of these outputs can be detected, and the distance from these detection results to the subject is found.

Figure 15:
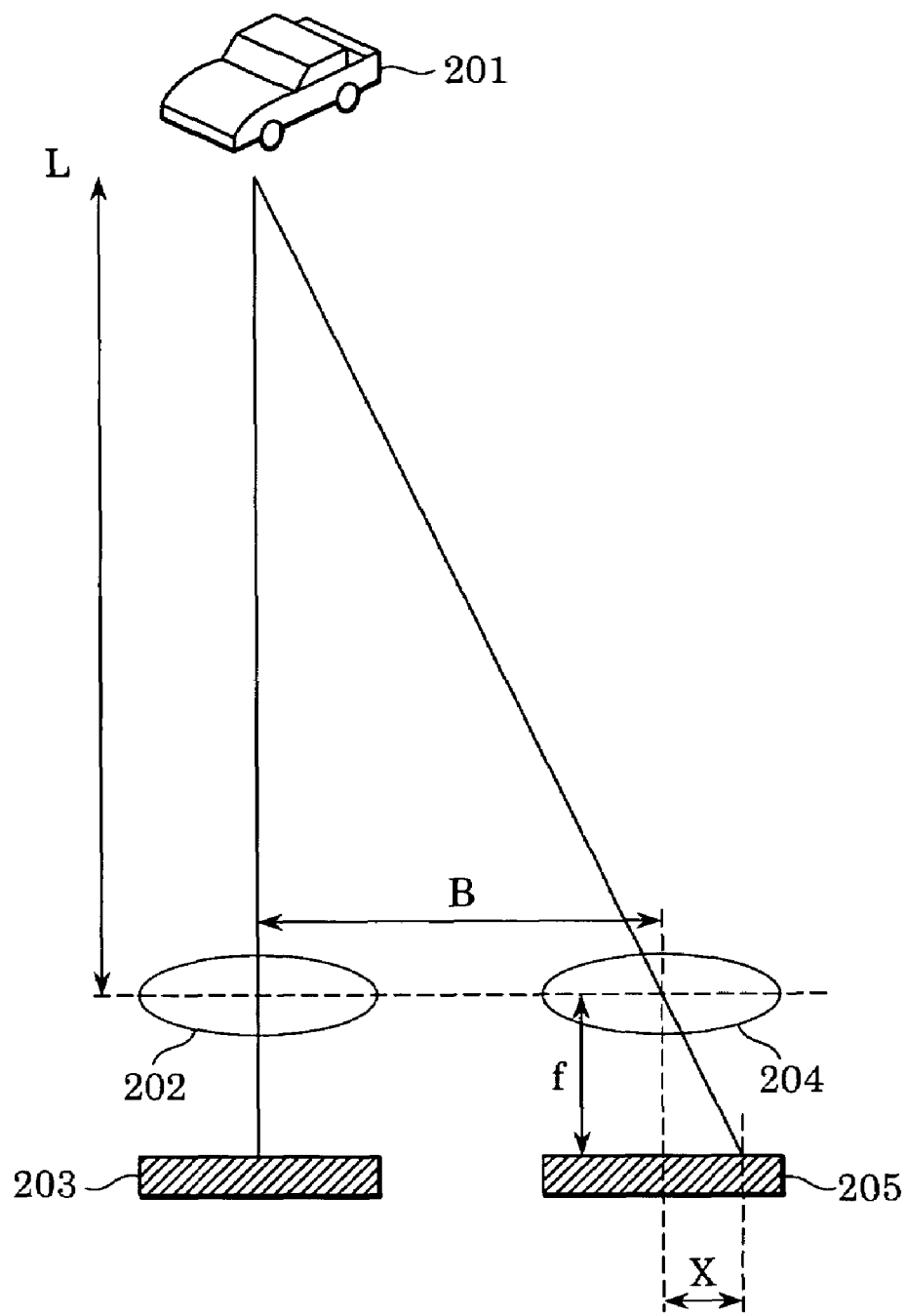
FIG. 15 is a diagram for describing triangulation.
Figure 16:
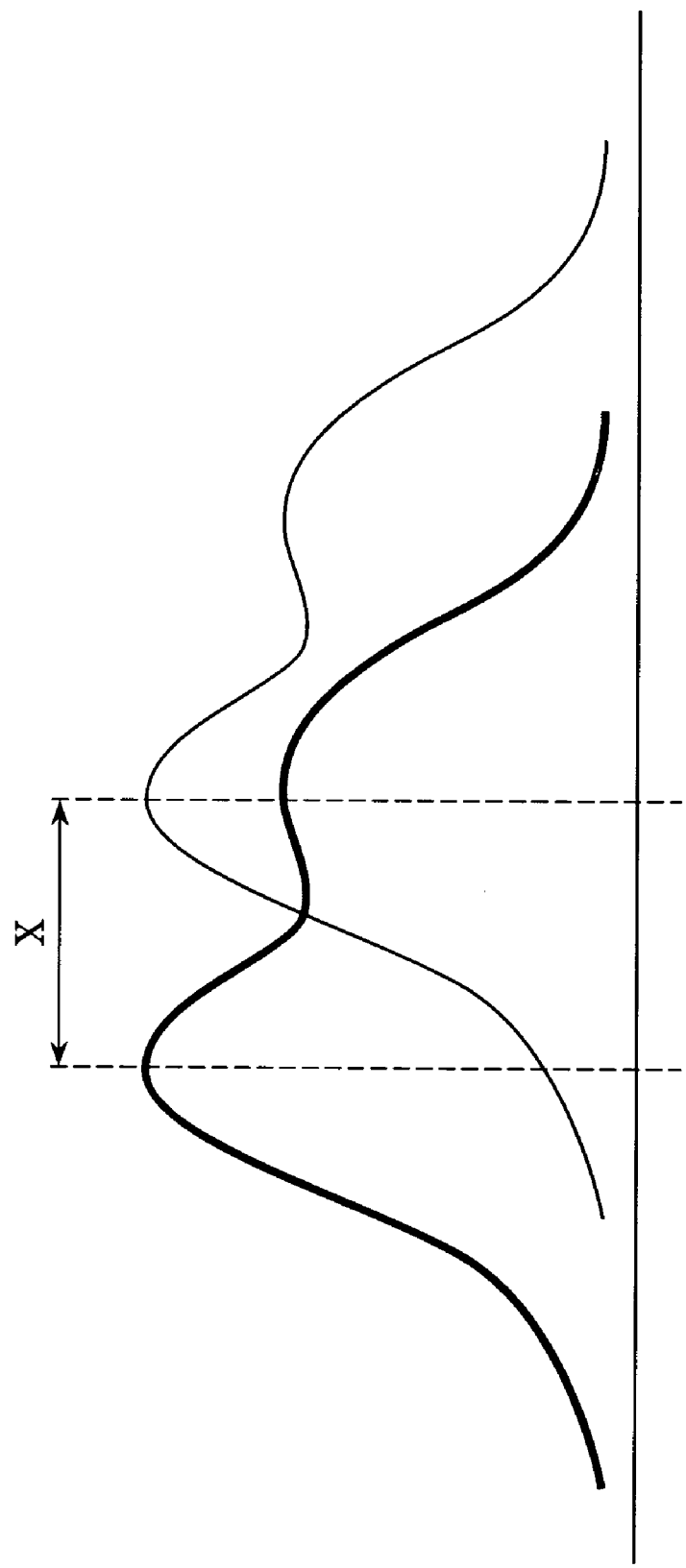
FIG. 16 is a diagram for describing a distance measurement method according to phase-difference detection.

A principal diagram of the distance calculation using triangulation or phase-difference detection is illustrated in FIG. 15 and FIG. 16. In FIG. 15, reference numeral 201 denotes a subject, 202 denotes an image forming lens for a first optical path, 203 denotes a line sensor for the first optical path, 204 denotes an image forming lens for a second optical path, and 205 denotes a line sensor for the second optical path. The line sensors 203 and 204 are installed apart by the distance of a base line B. Of the light from the subject 201, the light that passes through the first optical path by the image forming lens 202 forms an image on the line sensor 203, and the light that passes through the second optical path by the image forming lens 204 forms an image on the line sensor 205. Here, FIG. 16 illustrates an example of the signal readout from the line sensors 203 and 205 which have received the two subject images formed by passing through the first and second optical paths. Because the two line sensors are apart by the distance of the base line B, the subject image signal has only the offset of X number of pixels, as shown in FIG. 15. Therefore the correlation of the two signals can be calculated by offsetting the pixels, and X can be calculated by obtaining the amount of pixel offset wherein the correlation becomes greatest. Using the principle of triangulation, the distance L to the subject can be obtained from $L = B \times f / X$, using this X and the base line B, and the focal distance f of the image forming lens 202 and 204.

Further, as a distance detection means, an ultrasound sensor may be used to measure the propagation speed and detect the distance to the subject.

The distance information from the subject distance detecting circuit 127 is sent to the distance information processing unit 128. The distance information processing unit 128 performs the three types of processing below.

1. Calculates cam locus of which distance in FIG. 9 to which the zoom lens unit 102 and focus lens unit 105 positions correspond. The calculation for the cam locus outputs a virtual cam locus that internally divides the cam locus of the γ'th row and the γ'th+1 row of the row direction in FIG. 12 for the locus parameters α, β, and γ, by the ratio of α/β, as the subject distance and to how many meters this is equivalent to, for example, as described in process S401 in FIG. 4A, based on the current lens unit position. The locus parameters α, β, and γ, and the subject distance are converted at the fixed correlation table data, and the actual distance of the main subject can be output.

2. By inverting the actual distance of the subject from the subject distance detecting circuit 127, using the correlation table mentioned above in 1, the cam locus in FIG. 9 above that is denoted by the locus parameters α, β, and γ are found. At this time, the inverting process of the correlation table does not use the data from the wide angle side wherein the cam loci in FIG. 9 converge, and the loci are scattered. The data from the telephoto side is used as much as possible, and locus parameters with the highest possible resolution.

3. The actual distance difference and the differential direction is calculated for the above 1 and 2.

Of these processes 1, 2, and 3, the process 2 can identify the cam locus data correlating to the detection distance detected with the subject distance detecting circuit 127.

On the other hand, the camera microcomputer 116 also performs exposure control. The camera microcomputer 116 references the brightness level of the television signal formed in the camera signal processing circuit 108, controls the iris driver 124 so as to make the brightness level appropriate for exposure, and controls the opening of the aperture diaphragm 103. The opening amount of the aperture diaphragm 103 is detected using an iris encoder 129, and feedback control of the aperture diaphragm 103 is performed. Further, in the case that sufficient exposure control cannot be performed with the aperture diaphragm 103 alone, a timing generator (TG) 132 is used to control the exposure time of the imaging device 106, which handles anywhere from a high speed shutter to a so-called slow shutter for extended exposure. Further, when exposure is insufficient such as image-taking under low lighting, the television signal gain is controlled using the amplifier 107.

By operating a menu switch unit 135, the photographer can manually operate the image-taking mode or camera function switching appropriate for the image-taking state.

Next, the algorithm during zooming operation will be described with reference to FIGS. 3A and 3B. With the present embodiment, the computer zoom unit 119 in the camera microcomputer 116 executes the below-described operation flow processes, including the aforementioned various operation flows (programs).

Further, with the present embodiment, the cam locus to be followed is identified (formed) according to the distance information obtained from the subject distance detecting circuit 127, and zooming operation is performed. The operation flow in FIGS. 3A and 3B is an example of a method for zooming operation while establishing (producing) a zoom tracking curve which is the cam locus to be followed, using the distance information. This method is particularly effective in the case that the detection cycle of the AF evaluation value such as very high speed zoom becomes less fine, and sufficient contrast to establish the zoom tracking curve cannot be obtained from the TV-AF reference signal alone (AF evaluation value signal).

Figure 3A:
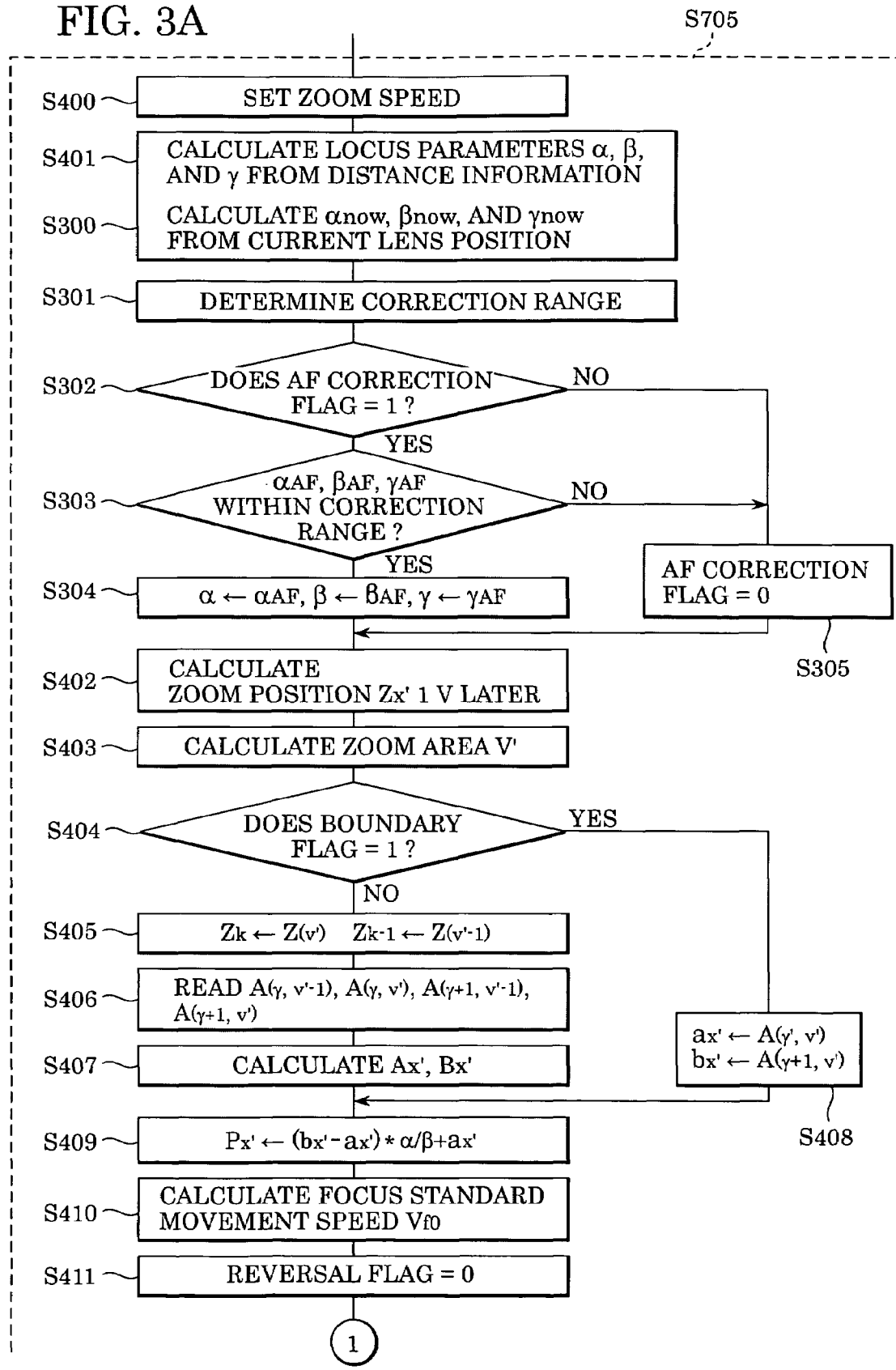
FIGS. 3A and 3B are flowcharts illustrating the actions of a video camera according to the first embodiment.
Figure 3B:
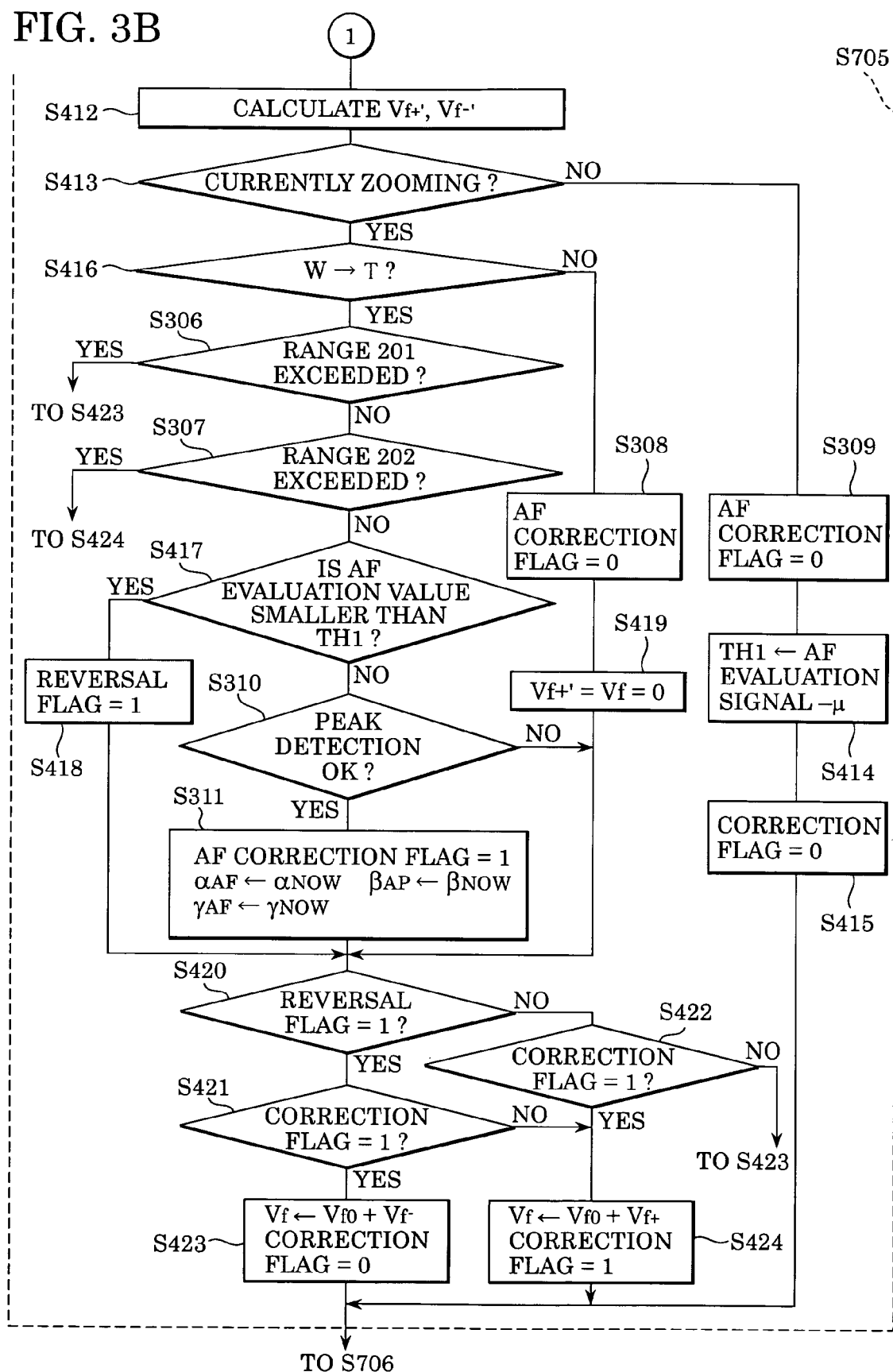
Figure 4A:
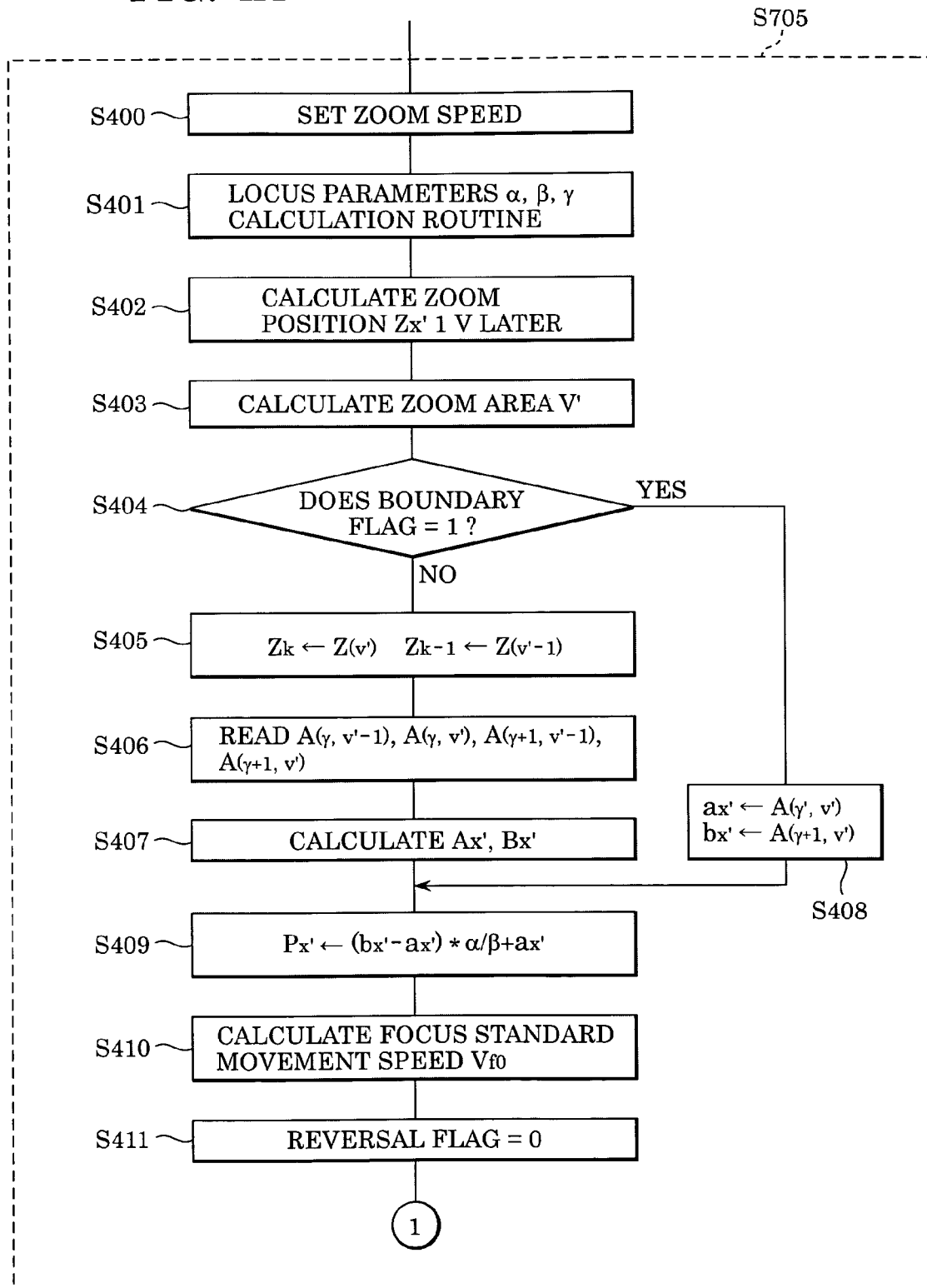
FIGS. 4A and 4B are flowcharts illustrating the underlying art of the present invention.
Figure 4B:
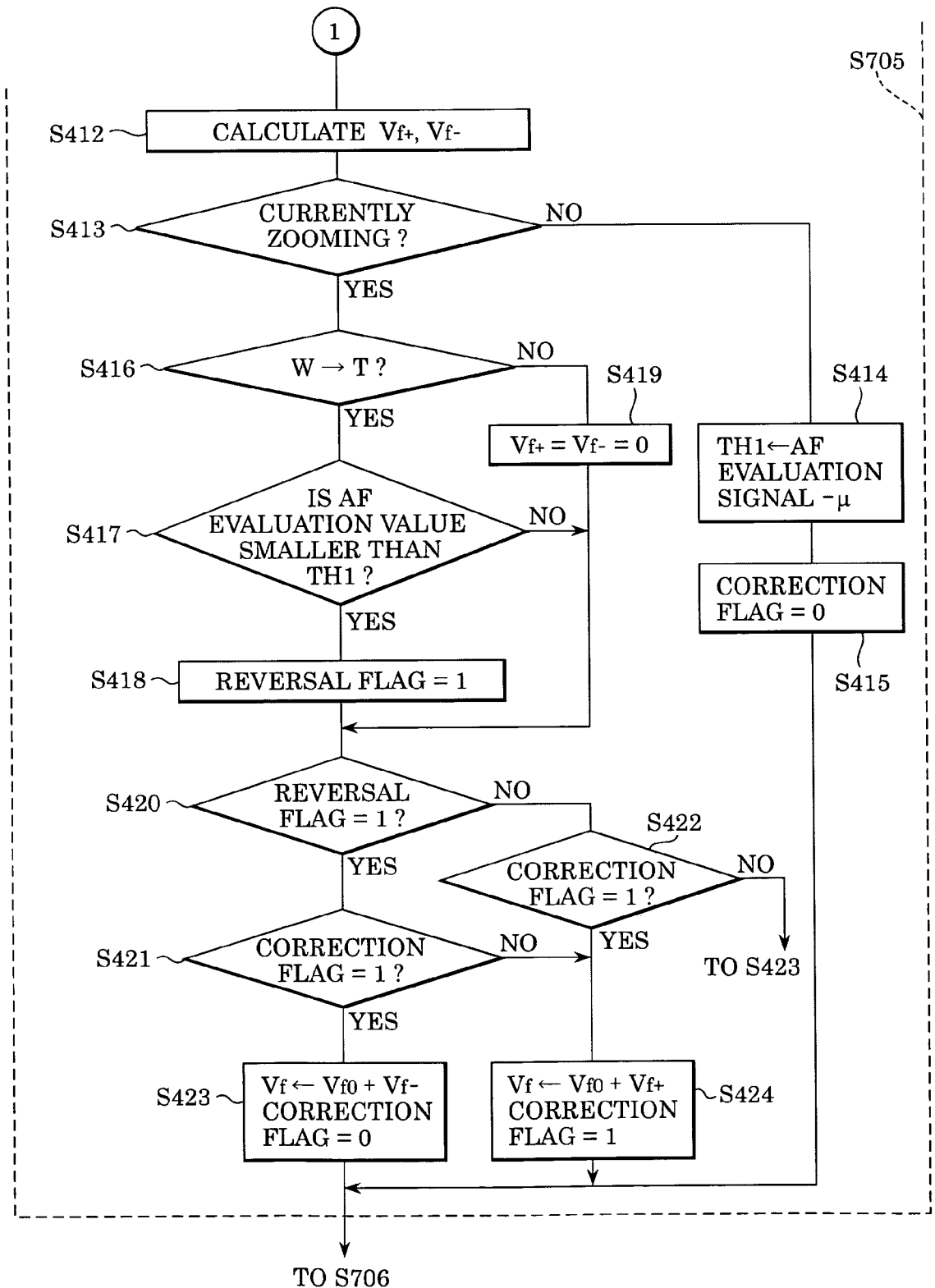

FIGS. 3A and 3B illustrate a process performed in S705 of FIG. 7 as described previously, and where the processes (steps) are the same as those in FIGS. 4A and 4B, the same reference numerals will be used and the description thereof will be omitted.

In S400, the zoom speed during zooming operation is determined. In S300, the distance to which cam locus of the representative locus illustrated in FIG. 9 the current main subject image-taking distance corresponds to is determined, according to the output signal of the subject distance detecting circuit 127, and the locus parameters α, β, and γ are calculated. Further, in the same way, the locus parameters αnow, βnow, and γnow corresponding to the current zoom lens position and focus lens position as described in S401 in FIG. 4A are calculated.

The αnow, βnow, and γnow are α, β, and γ calculated in the process from S512 to S515 in FIG. 5 and stored in memory under the respective names αnow, βnow, and γnow. On the other hand, the locus parameters based on the distance information obtained from the subject distance detecting circuit 127 are calculated as α, β, and γ using for example the following method.

First, in order to obtain the correlation between the output distance information and the representative locus (cam locus) illustrated in FIG. 9, the correlation between the distance change and the locus parameters are placed in a table data form in advance, within the range wherein the cam loci (cam curve) form of the representative subject distance is uniform. Therefore, the locus parameters are calculated using the distance information as input. As for the subject distance wherein the cam loci form changes, a lookup table is provided that shows a separate correlation, and having these multiple tables enables the locus parameters for each of the subject distances to be obtained.

Regarding the focal distance, of the discrete cam locus information in FIG. 9 that is within the memory as data, the locus parameters at the long focal distance side can be output so as to make the greatest resolution of the locus parameters α, β, and γ. Therefore, even if the current lens position is at the position wherein the cam loci are converging at the wide angle side as illustrated in FIG. 9, the locus parameters can be extracted at the point on the telephoto side wherein the cam loci are scattered, according to the distance information. Therefore, at the point wherein the zoom lens 102 is positioned on the wide angle side, one cam locus upon which the focus lens 105 should travel can be identified by calculating (interpolating) based on the locus parameters on the telephoto side.

Now, S300 is executed every certain cycle (for example, one vertical synchronizing signal). Therefore, even if the subject distance changes during zooming, the newest cam locus to follow is continuously updated according to the output of the subject distance detecting circuit 127.

Next, in S301, the correction range of the cam locus, which is a feature of the present invention, is determined based on the output of the subject distance detecting circuit 127 (in other words, α, β, and γ calculated in S300). This correction range is equivalent to the correction range in the correction operation for the following cam locus wherein the TV-AF signal (AF evaluation value), and may be, for example, the range between the upper limit 201 and the lower limit 202 illustrated in FIG. 2.

Here, according to the present embodiment, when the output from the subject distance detecting circuit 127 for example corresponds to the subject distance of 5 m (203), the correction range is controlled to be a range of ±50 cm of that subject distance. In other words, the upper limit 201 is a cam locus equivalent to corresponding with a subject distance of 4.5 m, and the upper limit 202 is a cam locus equivalent to corresponding with a subject distance of 5.5 m. Now, this correction range should be determined according to the detection sharpness of the subject distance detecting circuit 127.

In other words, the aforementioned correction range is set so as to control the re-generating range when performing precise re-generating of the following cam locus by the correction operation (zigzag operation) by the TV-AF signals, after a general following cam locus is specified based on the distance information from the subject distance detecting circuit 127.

Thus, the detecting resolution (detecting accuracy) of the subject distance detecting circuit 127 does not have to be so high, and as a result, a smaller imaging device can be provided at a lower cost. In addition, due to restricting the correcting range of the following cam locus, the number of times of directional switching when re-identifying the following cam locus using the TV-AF signal can be increased, and due to reducing the frequency of continuing to correct in the same correction direction, the occurrence of blurring can be prevented wherein perfect focus and image blurring were cyclically repeated according to the zigzag operation in the cases of image-taking a subject with a high frequency. Further, image blurring in the case of following an incorrect following cam locus or image blurring when recovering to the correct cam locus can be reduced.

Regarding the actual operation, the correction operation (zigzag drive) of the following cam locus using the TV-AF signal is performed within the range between the upper limit 201 and the lower limit 202, and in the case of deviating from this range, the focus lens 105 drive direction is reversed so as to return to this correction range. As a result, re-generating of the cam locus outside the range of the upper limit 201 and the lower limit 202 is prohibited.

According to the present embodiment, the correction range is set according to the detection resolution of the subject distance detecting circuit 127, and by allowing generating of the precise following cam locus by the TV-AF signal only within that range, erroneous movement resulting from dual use of the TV-AF signal or erroneous image blurring is reduced. In other words, by allowing re-generating of the following cam locus only when the generating results of the two types of cam locus generating methods agree, which are the generating method of a cam locus based on the output from the subject distance detecting circuit 127 and the generating method of a cam locus based on the detecting signal at the focus state of the TV-AF signal, an extremely highly precise cam locus following method can be realized by combining only the strengths of each generating method.

Specifically, when identifying the following locus by the TV-AF signal as described in the conventional art, the focus lens drive speed (correction speed) for the zigzag operation needed to be set to a speed capable of covering from the cam locus on the infinity side to the cam locus on the close-up side. In comparison, according to the present embodiment, by limiting the correction range of the cam locus, for example even if the focus lens correction speed is the same as the conventional art, the drive range has become narrower, and so the number of zigzag operations can be increased for each unit of time. Therefore, even at a high speed zoom, the cam locus generating precision by the TV-AF signal can be improved.

On the other hand, the setting value of the correction speed can be lowered by having the normal number of zigzag operations, the occurrence of blurring can be prevented wherein focusing and image blurring were cyclically repeated according to the correction operation when image-taking a subject with a high frequency (details will be described in the second embodiment). Therefore, an imaging device zooming system that has a high degree of freedom for implementing zoom functionality with the best control method according to the product use can be provided, such as priority for zoom speed or priority for appearance, even though using the same method. This is an addition advantage of the present embodiment and the present invention.

Figure 2:
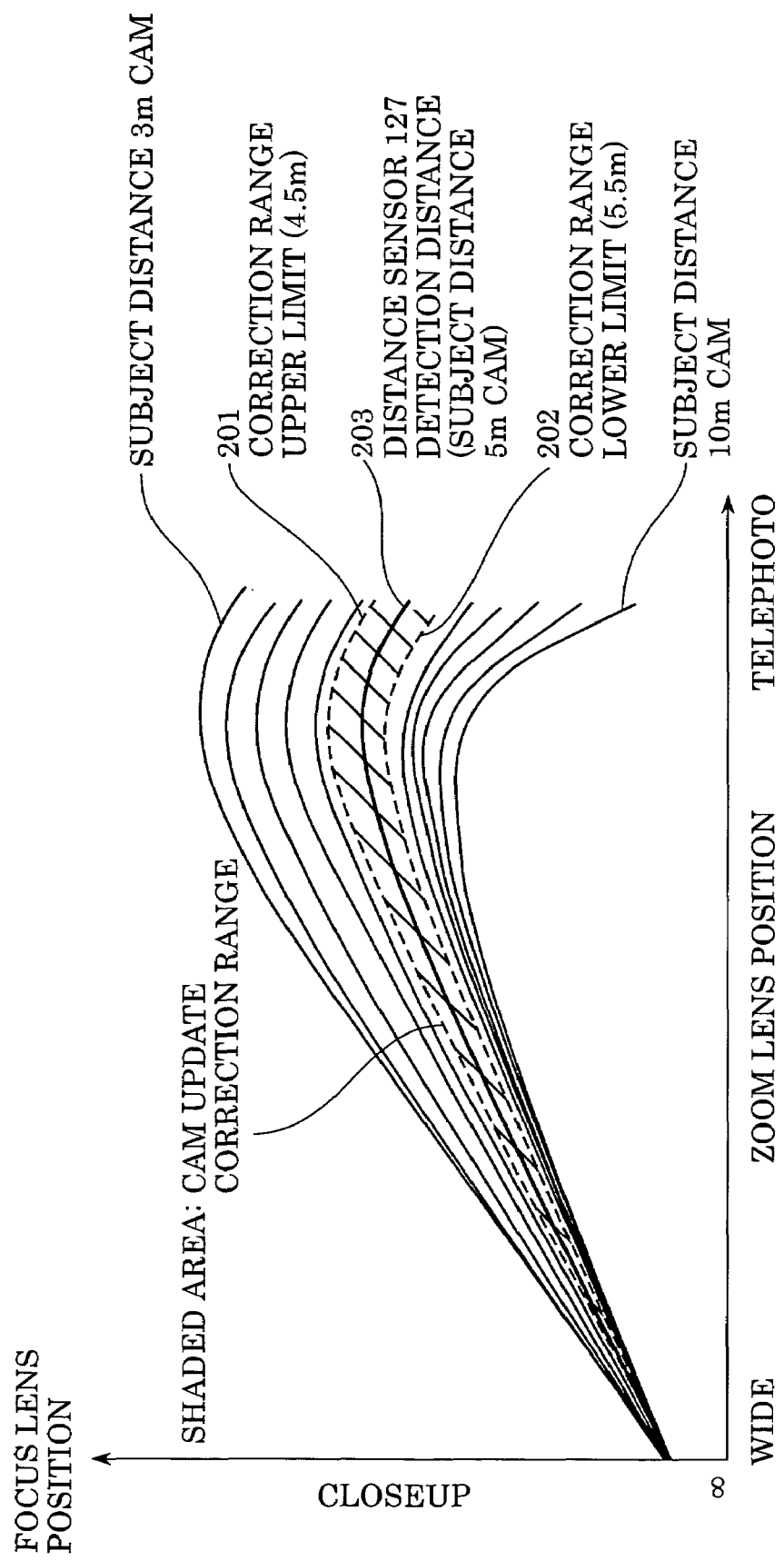
FIG. 2 is a conceptual diagram illustrating the correction range of the correction movement of the cam locus according to the first, second, and third embodiments.

Returning to the description of FIGS. 3A and 3B, in S302 whether or not the "AF correction flag" is in the set state is determined. If set, the flow continues to S303, and in S311, which will be described below, whether or not the locus parameters $\alpha AF$, $\beta AF$, and $\gamma AF$, which are updated with each detection that the AF evaluation value reaches the peak state 1301 level described in FIG. 13, are included in the correction range (the range between the upper limit 201 and the lower limit 202) illustrated in FIG. 2, is determined. If within this correction range, S304 sets each of these $\alpha AF$, $\beta AF$, and $\gamma AF$, to $\alpha$, $\beta$, and $\gamma$, and controls the focus lens 105 to trace the cam locus re-specified by this correction movement.

On the other hand, in the case that the locus parameters $\alpha AF$, $\beta AF$, and $\gamma AF$, are outside the correction range in S303, or in the event that the "AF correction flag" has been cleared in S302, the locus parameters $\alpha$, $\beta$, and $\gamma$, that are specified based on the distance information from the subject distance detecting circuit 127, that were already decided in S300, are held, and the focus lens 105 is controlled to trace the cam locus specified by these locus parameters $\alpha$, $\beta$, and $\gamma$.

Here, the "AF correction flag" is a flag showing whether or not the following cam locus has been re-specified by the later-described TV-AF signal, and in the case that generating is made based only on the distance information from the subject distance detecting circuit 127 (in the case where re-generating is not performed, or in the case that the cam locus is outside the correction range in FIG. 2 and the possibility of erroneous generating is high), in S305 the "AF correction flag" is cleared, and from the next time and thereafter, until the re-generating of the cam locus by the correction movement is performed, the locus trace control is performed giving priority to the generating results based on the distance information.

Hereafter, a process similar to that in FIGS. 4A and 4B is performed. In S402 the position $Z_x'$ (the position to which it should move from the current position) wherein the zoom lens 102 will arrive after one vertical synchronizing period (1V) is calculated. In the event that the zoom speed determined in S400 is Zsp (pps), the zoom lens position $Z_x'$ after one vertical synchronizing period can be obtained from the above-described Equation (7). Here, pps is an increment that shows the rotation speed of the stepping motor which is the zoom motor 121, and represents the step amount (1 step=1 pulse) of rotation during 1 second. The symbols in Equation (7) represent the movement direction of the zoom lens, + for the telephoto direction and − for the wide angle direction.

$$Z_x'=Z_x\pm Z_{sp}/\text{vertical synchronizing frequency} \quad (7)$$

Next, in S403, which zoom area v' $Z_x'$ exists is determined. In S403, the same process as the process illustrated in FIG. 6 is performed, and $Z_x$ in FIG. 6 is substituted with $Z_x'$, and v with v'.

Next, in S404, whether the zoom lens position $Z_x'$ after one vertical synchronizing period exists on the zoom area boundary is determined, and in the event that the boundary flag=0 this it not considered to be on the boundary, and the flow continues from the process starting with S405. In S405, $Z_{(v')}$ is set to $Z_k$, and $Z_{(v'-1)}$ to $Z_{k-1}$.

Next, in S406, out of the four table data sets $A_{(\gamma, v'-1)}$, $A_{(\gamma, v')}$, $A_{(\gamma+1, v'-1)}$, $A_{(\gamma+1, v')}$ wherein the subject distance $\gamma$ is specified by the process illustrated in FIG. 5 are read out, and $a_x'$ and $b_x'$ are calculated from the Equations (2) and (3) described above in S407.

On the other hand, in the case of Yes in S403, in S408 the focus lens positions $A_{(\gamma, \nu')}$ and $A_{(\gamma+1, \nu')}$ corresponding to the zoom area ν' of the subject distance γ are called up and stored in memory as $a_x'$ and $b_x'$, respectively. Then, in S409 the focus lens focus position (target position) $p_x'$ when the zoom lens position has reached $Z_x'$ is calculated. Using Equation (1), the target position of the focus lens 105 after one vertical synchronizing period can be expressed as follows.

$$P_x' = (b_x' - a_x') \times \alpha/\beta + a_x' \qquad (8)$$

Therefore, the difference of the target position and the current focus lens position becomes $$\Delta F = (b_x' - a_x') \times \alpha/\beta + a_x' - P_x$$

Next, S410 calculates the focus standard moving speed $V_{f0}$. $V_{f0}$ is obtained by subtracting the focus lens position difference ΔF from the movement time of the zoom lens 102 required to move this distance.

After completing the present process, the flow continues to S706 in FIG. 7, and in the event that zooming is being performed, movement is made at the focus speed determined in S410 in the direction of the symbol (positive for the close-up direction, and negative for the infinite distance direction) of this focus speed, thereby carrying out compensator actions.

In S411, each parameter is initialized. Here, the "reversal flag" used in the later processes is cleared. In S412 the correction speed $V_{f+}$ and $V_{f-}$ is calculated for the "zigzag correction operation" from the focus standard movement speed $V_{f0}$ obtained in S410. Here, the correction amount parameter δ and the correction speeds $V_{f+}$ and $V_{f-}$ are calculated using Equations (9) through (12) as described above, using FIG. 14.

In S413, whether or not zooming is being performed is determined, according to the information illustrating the operational state of the zoom switch 130 obtained during S703 illustrated in FIG. 7. In the even that zooming is being performed, the process from S416 on is carried out. Otherwise, in S309 the "AF correction flag is cleared, and preparation is made for the next zooming operation from the wide angle to the telephoto direction. Then in S414, a value TH1 (the level indicated by 1302 in FIG. 13A) is set, wherein a arbitrary constant μ is subtracted from the current value of the AF evaluation signal level. This TH1 determines the AF evaluation signal level that is the switchover base point for the correction direction vector (switchover base point for the zigzag correction operation), as described in FIG. 13A.

Next, in S415 the "correction flags" are cleared, and the process ends. Here, the "correction flag" is a flag indicating either a state wherein the cam locus following state is when the correction is in the positive direction (correction flag=1) or a correction state in the negative direction (correction flag=0), as described above.

If determination is made in S413 that zooming is being performed, determination is made whether or not the zooming direction is from wide angle to telephoto in S414. If No, the "AF correction flags" are cleared and preparation is made for the next wide angle to telephoto direction zooming operation to be performed (S308), similar to S309. Then at S419, $V_{f+}=0$ and $V_{f-}=0$ are set, and the process from S420 is performed and zigzag drive is not executed.

If Yes in S413, in S306 determination is made whether or not the focus lens position in relation to the current zoom lens position surpasses the upper limit 201 of the correction range illustrated in FIG. 2. If so, the flow continues to S423 to return the focus lens position to within the correction range.

In S423, the calculated focus speed (standard movement speed) $V_{f0}$ is added to the negative correction speed $V_{f-}$ (corrected to the infinite distance direction). By doing so, the focus lens 105 is forced to return to the direction of the lower limit 202 rather than the upper limit 201 of the correction range.

Further, in the event that the upper limit 201 has not been exceeded in S306, determination is made in S307 whether or not the focus lens position relating to the current zoom lens position is below the lower limit 202 of the correction range in FIG. 2. If so, the flow continues to S423 to return the focus lens position to within the correction range. In S423, the calculated focus speed (standard movement speed) $V_{f0}$ is added to the positive correction speed $V_{f+}$ (corrected to the close-up direction). By doing so, the focus lens 105 is forced to return to the direction of the upper limit 201 rather than the lower limit 202 of the correction range. Thus, the drive range of the focus lens 105 is controlled within the correction range, and as a result, the cam locus re-specified by the zigzag movement is also controlled within this correction range.

In the event that the focus lens position in S306 or S307 is not outside the correction range, determination is made in S417 whether or not the current AF evaluation signal level is smaller than TH1, in order to execute the zigzag movement. If Yes, the current AF evaluation level has moved lower than the level of TH1 (1302) in FIG. 13A, and therefore S418 sets a reversal flag to perform switching of the correction direction.

Determination is made in S420 whether the reversal flag=1, and if Yes, the flow continues to S421 and determination is made whether the correction flag is 1 or not. If S421 yields No, then the flow continues to S424 and sets the correction flag to 1 (correction state in the positive direction). According to Equation (4), Focus speed $V_f = V_{f0} + V_{f+}$ (wherein $V_{f+} \geqq 0$)

On the other hand, in the event that S421 is Yes, then the flow continues to S423 and sets the correction flag=0 (correction state in the negative direction), and according to Equation (5), Focus speed $V_f = V_{f0} + V_{f-}$ (wherein $V_{f-} \geqq 0$)

If S420 is determined to be No, S422 determines whether or not the correction flag=1. If Yes the flow continues to S424, and if No, the flow continues to S423.

After completing this process, in S706 in FIG. 7 the drive direction and drive speed of the focus lens 105 and zoom lens 102 are selected, according to the operation mode.

In the case of a zooming operation, the focus lens 105 drive direction is set to the close-up direction or the infinite distance direction depending on whether the focus lens movement speed $V_f$ obtained in S423 or S424 is positive or negative. Thus, the cam locus to be traced is re-specified as the focus lens 105 zigzag drive is performed.

During the process from S417 through S424 while performing the zigzag drive, the AF evaluation value signal is detected to have reached the peak level 1301 described in FIG. 13A. When S417 is No, S310 determines whether or not the peak level 1301 is detected. In the case that the peak level is detected, in S311, with the "AF correction flag=1" and the current values of the locus parameters as re-generating locus parameters by TV-AF, αAF←αnow, βAF←βnow, γAF←γnow is set. Then, the next time that the conditions are fulfilled in S302 and S303 (in the case that the determination results of both steps are Yes), in S302 the identified cam locus is updated.

This time, the locus parameters updated and re-specified in S304 are updated to the specified cam locus based on the distance information, by the correction range in S301 changing by the change of the detected distance information, or by the zooming operation stopping, or by the zooming direction reversing.

In the case that the next time the conditions are not fulfilled in S302 and S303, each time a new peak level is detected (S310), the updating of αAF, βAF, and γAF is repeated and the most appropriate cam locus is continuously updated during zooming operation.

Now, in the case that the AF evaluation value level is not detected to have reached the peak level in S310, the flow continues on to S420, and without switching the correction direction by the zigzag operation, drives the focus lens 105 whiles correcting in the correction direction predetermined by the previous time.

By performing the above processes, the cam locus generating accuracy using the TV-AF signal can be greatly improved by limiting the identification range (correction range) in the case of identifying the cam locus to be followed using the TV-AF signal, based on the distance information to the subject. Therefore, problems such as disadvantages that accompany the detection cycle of the AF evaluation value with TV-AF, or problems that erroneously determine the wrong cam locus to be traced because of influence the TV-AF signal receives not only from the distance change but also from a change in the appearance of subject, or erroneous movement problems wherein the switching timing is incorrect for the zigzag movement, can be reduced. Therefore, the occurrence of image blurring can be reduced.

Specifically, the cam locus to be the standard in the distance information is specified, and by using the method of the present embodiment wherein the correction range is limited and the cam locus is corrected (re-specified) using the TV-AF signal, the correction resolution of the following cam locus based on the TV-AF signal can be improved. Therefore, the detecting resolution of the subject distance detecting circuit 127 does not need to be so fine, and a smaller and less costly type of subject distance detecting circuit 127 can be employed.

Second Embodiment

The first embodiment has been described regarding a case in which the correction speed of the correction movement for the focus lens 105 by the TV-AF signal is calculated in the same way as with the conventional art described in FIGS. 4A and 4B. Because of this, in the first embodiment, the movement distance (drive range) of the focus lens 105 is lessened because of the limits on the correction range, and as a result, the frequencies of the zigzag operation within the correction range increases. Therefore, a system is provided wherein the generating functionality of the following cam locus is high, even at a high speed zoom and so forth.

In contrast, according to the second embodiment, the correction speed is set slower than in the case of the first embodiment, and attempts to reduce the cyclical image blurring that accompanies the zigzag movement and so forth.

For example, if the correction speed is set at half the amount of the first embodiment, the overshooting amount of the drive direction reverse timing of the focus lens 105 illustrated in FIG. 13B is reduced, and therefore the type of phenomenon wherein focusing and image blurring are cyclically repeated according to the zigzag operation can be prevented from occurring.

In order to change the correction speed to ½, the process wherein the correction speed $V_{f+}$ and $V_{f-}$ is calculated in S412 illustrated in FIGS. 3A and 3B is cut in half may be added, for example. Further, computations can be made by providing a coefficient to Equations (4) and (5).

$$\text{Focus speed } V_f = V_{f0} + V_{f+}/2 \text{ (wherein } V_{f+} \leq 0) \qquad (4)'$$

$$\text{Focus speed } V_f = V_{f0} + V_{f-}/2 \text{ (wherein } V_{f-} \leq 0) \qquad (5)'$$

Now, the aforementioned embodiments have been described regarding a case of controlling the range for when the cam locus (α, β, γ) to be followed is identified (generated) based on the distance information to the subject, but the present invention may also be applied in the case of controlling the range based on the distance information to the subject, when the focus lens target position is calculated (generated).

As described in the first embodiment and the second embodiment, the range of information (locus information and so forth) that is generated to control the drive of the second lens unit, based on the distance to the detected focus object, is limited, and therefore can avoid producing information that does not correspond to the distance to the object for which focus is actually desired, and image blurring during zooming can be reduced.

Here, the aforementioned information is generated based on the distance to the focus object detected and the aforementioned data, and as a basis for this aforementioned generated information, and in the case of performing forming processing wherein new information is generated using the focus signal representing the focus state of the optical system based on this detected distance in the event that the range of information generated by this forming process is limited, problems such as disadvantages that accompany the detection cycle of the focus signal, or problems wherein incorrect information is generated because of influence the focus signal receives, not only from the distance change but also from change in the appearance of the focus object, or erroneous movement problems wherein the switching timing is incorrect for the zigzag movement, can be avoided, and the occurrence of image blurring during the forming process can be reduced, and focus maintenance control with high precision during zooming can be performed.

Further, in the re-generating process, in the case of changing the driving conditions of the lens unit to move this second lens unit towards the position wherein the focus signal represents the most focused state corresponding to the drive state when driving based on this aforementioned standard information, the second lens unit drive range is limited based on the detected distance, and by doing so, the second lens unit can avoid driving based on incorrect information. In addition, even in the case wherein the switching timing of the zigzag movement is wrong, the image blurring amount can be reduced, and can quickly make transition to driving based on the correct information.

Third Embodiment

The zigzag movement disclosed in the aforementioned Japanese Patent No. 2,795,439 specifies the following locus based on the change of the AF evaluation value. However, the evaluation value changes not only according to the status of blurring of the image, but also changes according to changes in appearance of the subject. Therefore, there may be a case wherein the focus lens movement switching is switched in the wrong direction. In the event that the movement deviates from the locus that should be used, the image may blur until moved back to the correct locus. Further, in the case of moving the focus lens in the wrong direction, image blurring may occur wherein the AF evaluation value level in particular is greatly reduced, or when image-taking of a subject with low contrast, the correct locus may not be found, and the possibility exists that the image blur may be carried all the way to the telephoto edge.

Specifically, when starting zooming from the wide angle side wherein the cam locus spacing is crowded, if the drive starting direction by the zigzag driving is in the opposite direction from the direction of the cam locus (focus locus) to be specified, the image blurring is noticeable even if the offset from the position of the focus locus is small because the focus depth is shallow at the wide angle side. Further, as described above, on the wide angle side wherein the subjects from infinity to several 10 cm away are all focused on at the same focus position, in the event that multiple objects with differing subject distances exist within the wide angle, the image of these subjects all become blurred, and the quality of the image becomes very poor.

The algorithm during zooming operation will be described with reference to FIGS. 17 and 18. According to the present embodiment, the computer zoom unit 119 in the camera microcomputer 116 executes the later-described operation flow processes, including the aforementioned various operation flows (programs). Now, in FIGS. 17 and 18, the portions indicated by the same circled numeral are connected to one another.

Further, according to the present embodiment, the cam locus to be followed is established (formed) according to the distance information obtained from the subject distance detecting circuit 127, and zooming operation is performed. The operation flow shown in FIGS. 4A and 4B is an example of a method as described above for zooming operation while precisely establishing (generating) a zoom tracking curve which is the cam locus to be followed, using the distance information. This method is particularly effective for recovering image blurring in the case that the focus lens 105 is moved off the focus cam locus during zooming, or reducing image blurring at the start of the zooming operation.

Figure 17:
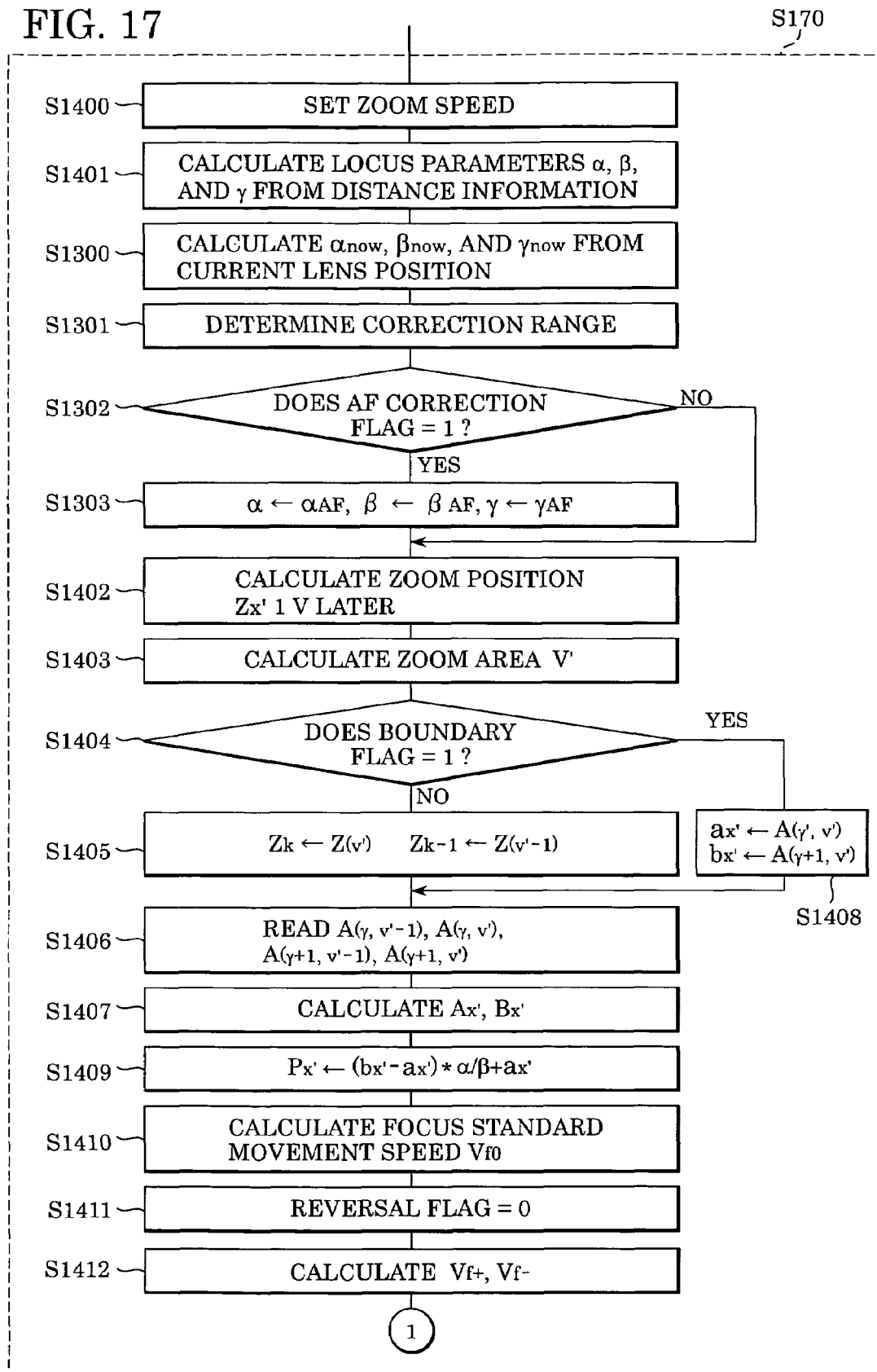
FIG. 17 is a flowchart illustrating the actions of a video camera according to the third embodiment.
Figure 18:
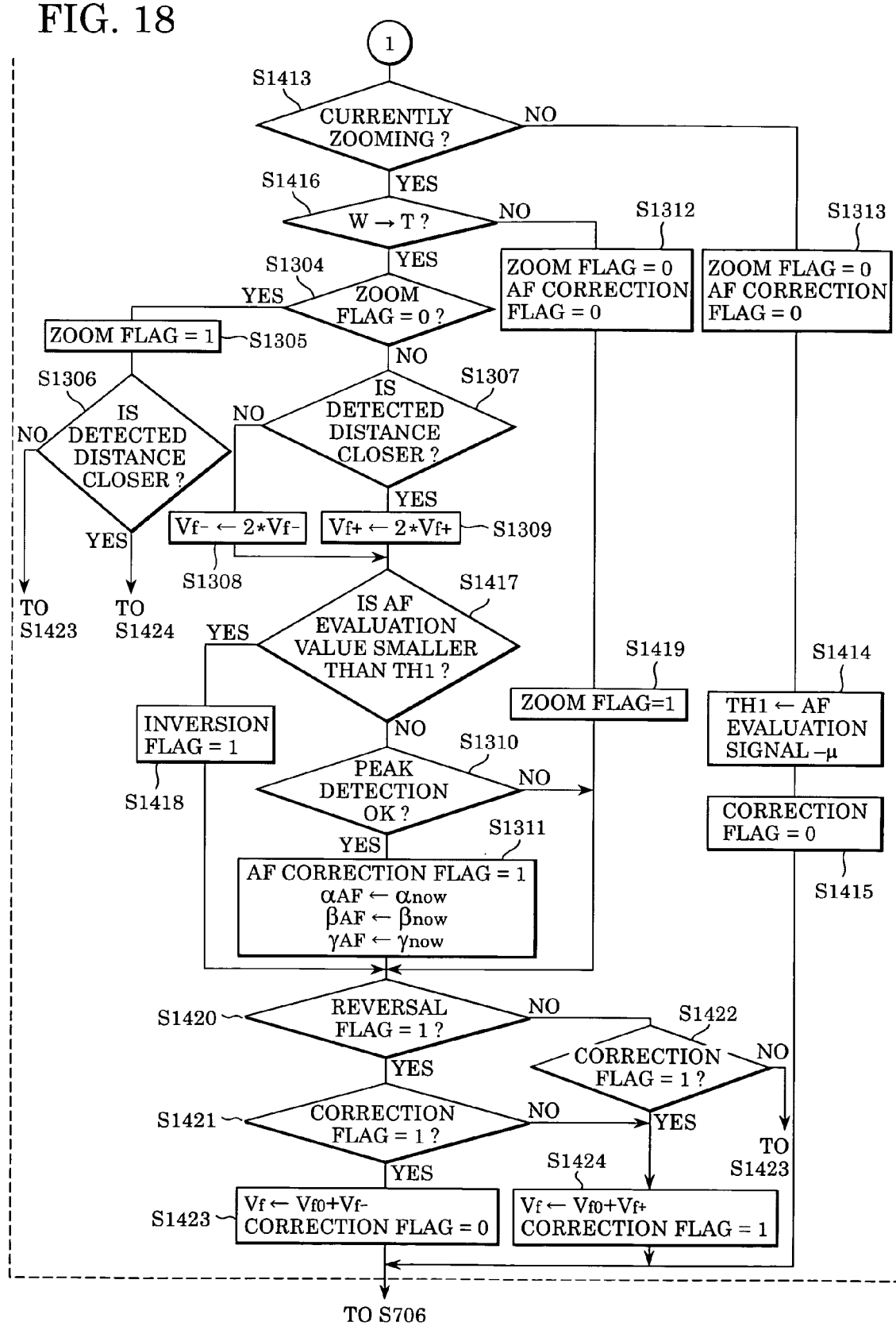
FIG. 18 is a flowchart illustrating the actions of a video camera according to the third embodiment.

FIGS. 17 and 18 are processes performed in S705 of FIG. 7 as described previously, and wherein the processes (steps) are the same as those in FIGS. 4A and 4B, the same reference numerals will be used and the description will be omitted.

In S1400, the zoom speed during zoom operation is determined. In S1401, which position on the cam locus in FIG. 9 the main subject being photographed is, is determined, from the current zoom lens position and the focus lens position. Here, from the interpolation process based on the cam locus data table (FIG. 12) storing the representative locus illustrated in FIG. 9 as discrete data, the cam locus where the current zoom lens and focus lens positions exist, including virtual cam locus, in other words three locus parameters that correspond to this cam locus are calculated as α, β, and γ, and are stored in a memory region such as RAM. This process is the same process as that described with reference to FIG. 5.

In S1300, the calculated locus parameters α, β, and γ are temporarily saved as αnow, βnow, and γnow, and additionally the locus parameters α, β, and γ are calculated regarding how many meters in actual the subject distance (estimated distance). The correlation between the locus parameters and the estimated distance can be calculated by creating in advance a table data of the correlation between the estimated distance and the locus parameter within the range wherein the cam curve form of the representative subject distance is uniform, with the locus parameters as input. At a subject distance wherein the cam curve form changes, a lookup table can be made to show different correlations, and by having these multiple tables, all of the estimated distances B can be obtained for each zoom lens position and focus lens position.

Next, in S1301, the output from the subject distance detecting circuit 127 is obtained. Then, the distance to the image-taking subject shown by the output from the subject distance detecting circuit 127 (actual distance) A is compared with the estimated distance B found from the current lens position in S1300, and determination is made whether the actual distance A is nearer (close-up direction) or farther (infinity distance direction) as compared to the estimated distance B.

Next, determination is made in S1302 whether or not the "AF correction flag" is in the set state. If set, the flow continues to S1303, and the locus parameters αAF, βAF, and γAF to be decided in the following S1311 are set as α, β, and γ respectively (stored in memory). Here, the changes in the AF evaluation signal are detected while performing the zigzag operation of the focus lens unit 105, and the locus parameters αAF, βAF, and γAF are the cam locus parameters when at the peak level 1301 in FIG. 13A. In other words, these are the cam locus information detected by the AF evaluation signal peak level, and represent the cam locus that the microcomputer 116 has confirmed as the true focus cam locus.

Thus, the locus parameters α, β, and γ that are updated in S1303 represent the cam locus re-specified based on the AF evaluation signal, and by continuing to perform re-specification of the cam locus repeatedly with a continuous zooming operation thereafter, the result is that the focus lens unit 105 can be made to trace (follow) the true focus cam locus.

On the other hand, in the event that the "correction flag" is cleared in S1302, the locus parameters α, β, and γ specified based on the distance information from the subject distance detecting circuit 127 that have already been decided in S1300 are held, and the focus lens 105 is controlled to trace the cam locus specified by these locus parameters α, β, and γ.

Here, the "correction flag" is a flag showing whether or not the cam locus to be followed has been re-specified by the below described AF evaluation signal, and once set (when the following cam locus is re-specified), it will not be cleared unless the zooming direction is switched or the zooming operation is stopped. The re-specified cam locus information (α, β, and γ) is re-specified (updated) continually based on the detection results of the AF evaluation signal, and at the focal distance wherein the cam loci are scattered, identified on the focus locus.

Hereafter, a process similar to that in FIGS. 4A and 4B is performed. In S1402, the position $Z_x'$ (the position to move to from the current position) where the zoom lens 102 will arrive after one vertical synchronizing period (1V), is calculated. In the event that the zoom speed determined in S400 is Zsp (pps), the zoom lens position $Z_x'$ after one vertical synchronizing period can be obtained from the above-described Equation. (7). Here, pps is an increment that shows the rotation speed of the stepping motor which is the zoom motor 121, and represents the step amount (1 step=1 pulse) of rotation during 1 second. The symbols in Equation (7) represent the movement direction of the zoom lens, + for the telephoto direction and − for the wide angle direction.

$$Z_x'=Z_x\pm Zsp/\text{vertical synchronizing frequency} \quad (7)$$

Next, in S1403, which zoom area v' where $Z_x'$ exists is determined. S1403 is the same process as the process illustrated in FIG. 6, and the $Z_x$ in FIG. 6 is substituted with $Z_x'$, and v with v'.

Next, determination is made in S1404 whether the zoom lens position $Z_x'$ after one vertical synchronizing period exists on the zoom area boundary, and if the boundary flag=0 is it not considered to be on the boundary, and the flow continues from the process starting with S1405. In S1405 $Z_{(v')}$ is set to $Z_k$, and $Z_{(v'-1)}$ to $Z_{k-1}$.

Next, in S1406 the four table data sets $A_{(\gamma, \nu'-1)}$, $A_{(\gamma, \nu')}$, $A_{(\gamma+1, \nu'-1)}$, $A_{(\gamma+1, \nu')}$ wherein the subject distance γ is specified by the process illustrated in FIG. 5 are calculated, and $a_x'$ and $b_x'$ are calculated from the Equations (2) and (3) described above in S1407.

On the other hand, in the case that S1403 is determined to be Yes, in S1408 the focus lens positions A(γ, v') and A(γ+1, v') corresponding to the zoom area v' of the subject distance γ are called up and stored in memory as $a_x'$ and $b_x'$, respectively. Then, in S1409 the focus lens focus position (target position) $p_x'$ when the zoom lens position has reached $Z_x'$ is calculated. Using Equation (1), the target position of the focus lens 105 after one vertical synchronizing period can be expressed as follows.

$$P_x' = (b_x' - a_x') \times \alpha / \beta + a_x' \quad (8)$$

Therefore, the difference ΔF of the following target position and the current focus lens position becomes $$\Delta F = (b_x' - a_x') \times \alpha / \beta + a_x' - P_x$$

Next, in S1410 the focus standard moving speed $V_{f0}$ is calculated. $V_{f0}$ is obtained by subtracting the focus lens position difference ΔF from the movement time of the zoom lens 102 required to move this distance.

After completing the present process, the flow continues to S706 in FIG. 7, and if zooming is being performed, moves at the focus speed determined in S1410 in the reference numeral direction (positive for the close-up direction, and negative for the infinite distance direction) of this focus speed, thereby performing compensator actions.

In S1411, each parameter is initialized. Here, the "reversal flag" used in the later processes is cleared. In S1412 the correction speed $V_{f+}$, $V_{f-}$ for the "zigzag correction operation" is calculates from the focus standard movement speed $V_{f0}$ obtained in S1410. Here, the correction amount parameter δ and the correction speeds $V_{f+}$, $V_{f-}$ are calculated using Equations (9) through (12) as described above with FIG. 14.

Determination is made in S1413 whether or not zooming is being performed, according to the information representing the operational state of the zoom switch 130 obtained during S703 in FIG. 7. If zooming is being performed, the process from S1416 is performed. If Yes the process from S1416 is performed. If No is determined, in S1313 the "zoom flag" and the "correction flag are cleared, and preparation is made for the next zooming operation from the wide angle to the telephoto direction. Then at S1414, a value TH1 (the level denoted by 1302 in FIG. 13A) is set, wherein a arbitrary constant μ is subtracted from the current value of the AF evaluation signal level. This TH1 is decided immediately prior to zooming, and this value is the level of 1302 in FIG. 13A.

Next, S1415 clears the "correction flags", and ends this process. Here, the "correction flag" is a flag denoting either a state wherein the cam locus following state is when the correction is in the positive direction (correction flag=1) or a correction state in the negative direction (correction flag=0), as described above.

In the event that determination is made in S1413 that zooming is being performed, determination is made whether or not the zooming direction is from wide angle to telephoto in S1414. If No, the "correction flags" are cleared and the preparation is made for the next wide angle to telephoto direction zooming operation to be performed (S1312), similar to S1313. Then at S1419, $V_{f+}=0$ and $V_{f-}=0$ are set, and the process from S1420 is performed and zigzag drive is not executed.

If S1413 is Yes, determination is made in S304 whether or not the "zoom flag" is in the cleared state. If cleared, the flow continues to S1305 because this is the first case wherein zooming is from the wide angle to the telephoto direction, the "zoom flag" is set, and further, so as to correctly match the correction direction (the drive start direction of the focus lens unit 105) of the zigzag movement based on the detecting result of the AF evaluation signal at zoom start time with the object distance direction of the main subject, determination is made in S1306 whether the distance information obtained from the output of the subject distance detecting circuit 127 is in the close-up direction or in the infinite distance direction compared to the distance corresponding to the current focus lens position.

Here, the process of S1306 is to determine the relationship between the estimated distance B that is based on the lens position determined in S1300, and the actual distance A that is based on the output of the subject distance detecting circuit 127 determined in S1301. In the case that the actual distance A is on the closer side of the estimated distance B, in other words, in the case that it is towards the close-up direction, the flow continues to S1424, and starts the zigzag movement correction in the correction direction of the close-up direction. In the case that S1306 is No, in other words the actual distance A is on the farther side of the estimated distance B, the flow continues to S1423 in order to start the correction movement from the infinite distance direction.

Thus, the present embodiment has a first feature wherein at the point of starting the zooming, the correction direction for the generating movement of the cam locus using the AF evaluation signal sets the distance corresponding to the focus lens unit 105 position (estimated distance B) so as to be closer to the distance (actual distance B) that is based on the output of the subject distance detecting circuit 127, in other words sets weighting relating to the drive direction of the focus lens unit 105.

By performing this type of movement, a phenomenon can be avoided wherein, when starting zooming from the wide angle side wherein the cam locus spacing is crowded, the drive starting direction of the focus lens unit 105 during zigzag operation moves in the opposite direction from the direction of the focus cam locus, which causes the image blurring to be conspicuous even if the offset from the position of the focus locus is small because the focus depth is shallow. Therefore, in the case that the focus cam locus direction at the wide angle and the focus lens unit 105 drive direction (correcting direction) is in the opposite direction, the problem wherein the images of objects with differing subject distances the image of these subjects all become blurred and the quality of the image becomes very poor can be prevented in advance.

The description will be continued from S1304. Once the "zoom flag" is set in S1306, the flow continues to S1307 based on the determination results at S1304 (zoom flag=1) from the next time. As with S1306, determination is made in S1307 whether or not the distance information based on the output of the subject distance detecting circuit 127 (actual distance A) is closer than the estimated distance B. If Yes, S309 sets $V_{f+}$ at twice the value, to give priority weighting to the close-up direction of the zigzag movement. On the other hand, in the case that S1307 is No, the flow continues to S1308, and adds weighting by doubling $V_{f-}$. This is a second feature of the present embodiment wherein weighting is added to the correcting movements for re-generating of the cam locus using the AF evaluation signal, based on the detected actual distance A (according to the relationship between the actual distance A and the estimated distance B).

Because of this weighting correction process, for example, when identifying the cam locus based on the changes in the AF evaluation signal, not only does the AF evaluation signal change due to the image blurring state, but also changes due to the changes in the design of the subject, and therefore, the problem of the correction direction being incorrectly switched (problems such as the image blurring continuing for a long time until returning to the correct locus, or the image blurring being carried all the way to the telephoto edge) can be avoided.

As one example of the weighting process, the present embodiment described the case wherein the focus lens unit 105 drive speed (correction speed) for the correction process is doubled, based on the detected actual distance A, but the present invention does not need to be limited to this. For example, the weighting ratio of the correction speed can be changed according to the difference between the detected actual distance A and the estimated distance B based on the lens position and the direction thereof.

Further, rather than increasing the correction speed in the direction moving closer to the actual distance A, the correction speed in the opposite direction may be decreased.

Further, the AF evaluation value switching level (TH1) 1302 shown in FIG. 13A as a condition for switching the correction direction can be set low in the direction moving closer to the focus lens position corresponding to the actual distance A, and this level 1302 set high in the correction direction that moves away from the focus lens position corresponding to the actual distance A, whereby the frequency of correction operations in the direction moving closer to the focus lens position corresponding to the actual distance A can be increased.

Thus, zigzag operation is executed by performing the processing after S1417 while performing the weighting process of the zigzag operation based on the detected distance information during zooming operation. First, S1417 determines whether or not the current AF evaluation signal level is smaller than TH1. If Yes, then in S1418 a reversal flag is set to perform correction direction switching, since the current AF evaluation signal level has become lower than the TH1(1302) level in FIG. 13A.

In S1420, determination is made whether the reversal flag=1, and if Yes, the flow continues on to S1421 where determination is made whether the correction flag is 1 or not. If No in S1421, the flow continues to S1424, and sets the correction flag to 1 (the correction state in the positive direction). Based on Equation (4), Focus speed $V_f = V_{f0} + V_{f+}$ (wherein $V_{f+} \geq 0$).

On the other hand, if S1421 is Yes, the flow continues to S1423, and sets the correction flag to 0, (the correction state in the negative direction), and based on Equation (4), Focus speed $V_f = V_{f0} + V_{f-}$ (wherein $V_{f-} \geq 0$).

In the case that S1420 is determined to be No, determination is made whether or not the correction flag is 1 at S1422, and if Yes the flow continues to S1424, and if No, to S1423.

After completing this process, in S706 in FIG. 7, the direction and drive speed of the focus lens and zoom lens drive are selected, according to the operation mode.

In the case of zooming operation, here the focus lens 105 drive direction is set to the close-up direction or the infinite distance direction, depending on whether the focus lens movement speed $V_f$ obtained in S1423 or S1424 is positive or negative. Thus, the cam locus to be traced is re-specified while the focus lens 105 zigzag drive is performed.

During the process from S1417 through S1424 while performing the zigzag drive, the AF evaluation value signal is detected to have reached the peak level 1301 described in FIG. 13A. In the event that S1417 is No, determination is made in S1310 regarding whether or not the peak level 1301 has been detected. In the case that the peak level has been detected, in S1311, with the "AF correction flag=1" and the current values of the locus parameters as re-generating locus parameters by TV-AF, $\alpha AF \leftarrow \alpha now, \beta AF \leftarrow \beta now, \gamma AF \leftarrow \gamma now$ is set. Then, the next S1302 determines the "correction flag=1", and so in S1303 the generating cam locus is updated.

This time, as long as the zooming operation does not stop or the zooming direction does not reverse, the locus parameter updated and re-specified in S1303 repeats the updating of $\alpha AF$, $\beta AF$, $\gamma AF$ in S1311 each time a new peak level is detected (S1310), and the optimal cam locus is constantly updated during zooming operations.

Now, in the case that the AF evaluation value level is not detected to have reached the peak level in S1310, the flow continues on to S420, and without switching the correction direction by the zigzag operation, drives the focus lens 105 whiles correcting in the correction direction predetermined by the previous time.

According to the present embodiment as above, weighting settings based on the detected distance information are made relative to the drive start direction of the focus lens unit 105 in the zigzag movement, and therefore the occurrence of image blurring during the zigzag operation can be reduced.

In addition, the possibility exists of the main subject changing distance during zooming operation, but according to the present embodiment, the cam locus can be changed over quickly and smoothly because weighting is added to the drive or drive speed in the direction moving closer to the focus lens position corresponding to the detected distance. Further, even in the event wherein the focus lens unit 105 is driven in the wrong direction by the correction movement from the AF evaluation signal, moving away from the correct cam locus that it should be following, the occurrence of image blurring can be reduced, and returning smoothly to the correct cam locus is enabled.

Further, using the methods according to the present embodiment enables the generating precision of the following cam locus based on the TV-AF signal (AF evaluation signal) to be improved. Therefore, the detecting precision of the subject distance detecting circuit 127 can be somewhat less fine, and a smaller and less costly type of subject distance detecting circuit 127 can be employed.

Therefore, according to the present embodiment, at the time of controlling the second lens drive to generate the aforementioned information (locus information and so forth), weighting is performed based on the distance to the detected focus object, and therefore, the driving of the second lens unit which would make the image blurring greater can be reduced. For example, relating to the drive direction of the second lens unit for generating the aforementioned information, weighting based on the detection results of the aforementioned distance enables driving toward the direction in which the image blurring of the second lens unit increases to be avoided. Further, relating to the drive direction of the second lens unit for generating the aforementioned information, weighting based on the detection results of the aforementioned distance enables driving toward the direction in which the image blurring decreases to be made quickly.

Further, in the case of switching the driving conditions of the second lens unit while driving in order to generate the aforementioned information, performing weighting based on the detection results of the aforementioned distance relating to the conditions to switch the driving condition enables the switching of the driving conditions of the second lens unit to be made according to the detecting distance, and the aforementioned information can be generated quickly.

As described above, according to the present embodiment, at the time of generating the aforementioned information, weighting that corresponds to the detecting distance can be added to the drive control of the second lens unit, whereby the occurrence of image blurring can be reduced, and quick and smooth information generation can be realized. As a result, the focus of the focus objects can be maintained in a sure manner (following the zooming by the first lens unit).

Further, at the time of generating the aforementioned information using a focal point signal that indicates the focal point state of the aforementioned optical system obtained from the photoelectric conversion signals of the optical image formed by the optical system including the first and second lens units (for example, the re-generating process), by using the drive control of the second lens unit or appropriately setting the condition for drive condition switching of the second lens unit for the so-called zigzag operation, problems can be avoided wherein the focal point signal is influenced not only by changes in distance but also changes in the appearance of the focus objects, the second lens unit drives and image blurring becomes noticeable.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A lens control device for controlling driving of a second lens unit for correcting image movement in the event of movement of a variating first lens unit, said lens control device comprising:

a storage unit for storing data indicating the position of said second lens unit corresponding to a distance to a focus object and the position of said first lens unit computed for a predetermined focal distance;

a control unit for generating information to control the driving of said second lens unit based on said data, and for controlling the driving of said second lens unit based on this information; and a distance detecting unit outputting information corresponding to the distance to the focus object by detecting light from the focus object;

wherein said control unit drives while switching the driving conditions thereof for said second lens unit to generate said information, and performs weighting based on the positions of the first and second lens units and the detection results from said distance detecting unit relating to the conditions for switching the driving conditions.

2. A lens control device according to claim 1, wherein said control unit generates said information using a focal point signal indicating the focal point state of said optical system obtained from photoelectric conversion signals of the optical image formed by the optical system that includes said first and second lens units.

3. A lens control device for controlling driving of a second lens unit for correcting image movement in the event of movement of a variating first lens unit, said lens control device comprising:

a storage unit for storing data indicating the position of said second lens unit corresponding to a distance to a focus object and the position of said first lens unit computed for a predetermined focal distance;

a control unit for generating information to control the driving of said second lens unit based on said data, and for controlling the driving of said second lens unit based on this information; and a distance detecting unit outputting information corresponding to the distance to the focus object by detecting light from the focus object;

wherein said control unit performs re-generating processing to re-generate said information, by driving said second lens unit using said information as a reference, and performs weighting based on the positions of the first and second lens units and the detection results from said distance detecting unit relating to the drive control of said second lens unit in said re-generating process.

4. A lens control device according to claim 3, wherein said control unit generates said information based on the detection results from said distance detecting unit and said data, and using a focal point signal indicating the focal point state of said optical system obtained from photoelectric conversion signals of the optical image formed by the optical system that includes said first and second lens units, performs said re-generating process.

5. A lens control device according to claim 4, wherein said control unit drives said second lens unit while switching the driving conditions thereof, so as to move said second lens unit towards the position shown as the most focused state by said focal point signal, and performs weighting based on the detection results from said distance detecting unit relating to the conditions of said focal point signal for switching the driving conditions.

* * * * *